United States Patent
Hsu

(10) Patent No.: US 9,767,706 B2
(45) Date of Patent: Sep. 19, 2017

(54) STRINGLESS BOWED MUSICAL INSTRUMENT

(71) Applicant: Jeffrey James Hsu, Broomfield, CO (US)

(72) Inventor: Jeffrey James Hsu, Broomfield, CO (US)

( * ) Notice: Subject to any disclaimer, the term of this patent is extended or adjusted under 35 U.S.C. 154(b) by 0 days.

(21) Appl. No.: 14/534,162

(22) Filed: Nov. 5, 2014

(65) Prior Publication Data

US 2015/0122109 A1    May 7, 2015

Related U.S. Application Data

(60) Provisional application No. 61/899,992, filed on Nov. 5, 2013.

(51) Int. Cl.
*G09B 15/06* (2006.01)
*G10H 3/06* (2006.01)
(Continued)

(52) U.S. Cl.
CPC ............ *G09B 15/06* (2013.01); *G10H 3/06* (2013.01); *G10H 3/143* (2013.01); *G10H 3/18* (2013.01);
(Continued)

(58) Field of Classification Search
CPC .... G09B 15/06; G10H 3/06; G10H 2230/075; G10H 2220/465
(Continued)

(56) References Cited

U.S. PATENT DOCUMENTS 88,423 A * 3/1869 Upson ............ G10D 1/02
84/274
322,270 A 7/1885 Engel
(Continued)

FOREIGN PATENT DOCUMENTS

CN    2482170 Y    3/2002
CN    2522954 Y    11/2002
(Continued)

OTHER PUBLICATIONS

Griffiths, "A digital one-man band: Instrument can be played as a keyboard, guitar and a drum kit," The Daily Mail, published on Mar. 4, 2015, 5 pages.
(Continued)

*Primary Examiner* — David Warren
*Assistant Examiner* — Christina Schreiber
(74) *Attorney, Agent, or Firm* — Morrison & Foerster LLP

(57) ABSTRACT

Bowing platforms are disclosed for use in playing a bowed musical instrument without reliance on strings. A bowing platform includes a support and a track that replace the strings, bridge, and tailpiece on a conventional bowed instrument, to provide an alternative vibrational bowing surface. The bowing platform can be attached to a conventional fingerboard or to the body of the instrument. In one aspect, the bowing platform is useful as a bow guide to improve bow technique by restricting the player's bow angle to be within a desirable range, while still allowing for natural arm movement. The bowing platform can be further equipped with piezoelectric sensors to sense bowing motion and to create sound electronically in response to the sensed motion. A stringless bowed instrument includes a bowing platform, bowing sensors, and pitch sensors that sense finger placement along the fingerboard.

24 Claims, 17 Drawing Sheets

(51) Int. Cl.
*G10H 3/14* (2006.01)
*G10H 3/18* (2006.01)

(52) U.S. Cl.
CPC . *G10H 2220/161* (2013.01); *G10H 2220/365* (2013.01); *G10H 2220/411* (2013.01); *G10H 2220/465* (2013.01); *G10H 2230/075* (2013.01)

(58) Field of Classification Search
USPC .......................................................... 84/465
See application file for complete search history.

(56) References Cited

U.S. PATENT DOCUMENTS

| | | | |
|---|---|---|---|
| 766,549 A | 8/1904 | Strauss et al. | |
| 1,275,202 A * | 8/1918 | Becker | G10D 1/02 84/274 |
| 1,694,786 A | 12/1928 | Larsen | |
| 1,753,053 A * | 4/1930 | Braunstein-Loskant | G10D 3/166 84/283 |
| 2,239,579 A * | 4/1941 | Solodar | G09B 15/06 84/283 |
| 3,051,034 A | 8/1962 | Kozak | |
| 3,730,964 A * | 5/1973 | Kaplan | G10D 3/166 84/283 |
| 4,177,705 A * | 12/1979 | Evangelista | G10H 1/342 84/720 |
| 4,630,520 A * | 12/1986 | Bonanno | G10H 1/342 84/647 |
| 4,776,323 A | 10/1988 | Spector | |
| 4,854,212 A * | 8/1989 | Levin | G10D 3/166 84/283 |
| 4,986,792 A * | 1/1991 | Chen | G10H 1/32 446/302 |
| 5,038,662 A * | 8/1991 | Ho | G09B 15/04 84/453 |
| D322,270 S | 12/1991 | Concoff | |
| 5,085,119 A * | 2/1992 | Cole | G10H 1/342 84/724 |
| 5,670,727 A * | 9/1997 | Xiao | G09B 15/06 84/283 |
| 5,739,455 A * | 4/1998 | Poon | G10H 1/0083 84/478 |
| 6,479,741 B1 | 11/2002 | Morton et al. | |
| 6,777,600 B2 * | 8/2004 | Daring | G10D 3/16 84/274 |
| 7,521,619 B2 | 4/2009 | Salter | |
| 7,777,117 B2 * | 8/2010 | Salter | G09B 15/00 84/470 R |
| 8,093,486 B2 * | 1/2012 | Behringer | G10H 1/0008 84/615 |
| 8,471,138 B2 * | 6/2013 | Wallace | G10H 3/00 84/733 |
| 8,492,641 B2 * | 7/2013 | Menzies-Gow | G10H 1/0553 84/724 |
| 8,796,529 B2 * | 8/2014 | Butera | G10H 1/32 84/647 |
| 8,975,501 B2 * | 3/2015 | Roebke | G10H 3/18 84/615 |
| 9,082,380 B1 | 7/2015 | Hamilton et al. | |
| 9,224,376 B1 * | 12/2015 | Feng | G10H 3/06 |
| 2004/0237751 A1 * | 12/2004 | Foxwell | G10D 3/166 84/283 |
| 2006/0011049 A1 * | 1/2006 | Takabayashi | G10H 3/185 84/734 |
| 2007/0121095 A1 * | 5/2007 | Lewis | G01S 7/4813 356/5.01 |
| 2008/0236374 A1 * | 10/2008 | Kramer | G10H 1/0016 84/733 |
| 2008/0307949 A1 | 12/2008 | Lee | |
| 2009/0071314 A1 * | 3/2009 | Huwaldt | G10G 1/02 84/314 R |
| 2009/0100992 A1 * | 4/2009 | Elion | G10H 1/0066 84/646 |
| 2011/0004328 A1 | 1/2011 | Darcey et al. | |
| 2011/0132180 A1 * | 6/2011 | Gobbers | G10H 1/14 84/622 |
| 2011/0146476 A1 | 6/2011 | Zimmerman | |
| 2012/0090446 A1 | 4/2012 | Moreno | |
| 2012/0210846 A1 * | 8/2012 | Sullivan | G10H 1/342 84/645 |
| 2012/0240751 A1 * | 9/2012 | Yonetani | G10H 3/18 84/726 |
| 2012/0272814 A1 * | 11/2012 | Menzies-Gow | G10H 1/0553 84/724 |
| 2013/0284001 A1 * | 10/2013 | Menzies-Gow | G10H 1/0553 84/724 |
| 2014/0083279 A1 * | 3/2014 | Little | G10H 1/0008 84/609 |
| 2014/0083280 A1 | 3/2014 | Little et al. | |
| 2014/0149911 A1 | 5/2014 | Lam | |
| 2015/0053065 A1 * | 2/2015 | Van Wagoner | G10G 1/02 84/465 |
| 2015/0269852 A1 | 9/2015 | Cecil et al. | |
| 2015/0279343 A1 | 10/2015 | Shi | |

FOREIGN PATENT DOCUMENTS

| | | |
|---|---|---|
| CN | 2655379 Y | 11/2004 |
| FR | 2502823 A1 | 10/1982 |
| WO | 91/05328 A1 | 4/1991 |
| WO | 97/43752 A2 | 11/1997 |
| WO | 2008/017233 A1 | 2/2008 |

OTHER PUBLICATIONS

Ravilious, "Gene for Left-Handed Trait Discovered," National Geographic News, Aug. 1, 2007, retrieved from http://news.nationalgeographic.com/news/pf/13282887.html, retrieved on Nov. 4, 2014, 2 pages.

Samuel, "Stringless Violin to Bring Feeling to Computer Music," New Scientist, May 16, 2002, retrieved from http://www.newscientist.com/article/dn2282-stringless-violin-to-bring-feeling-to-computer . . . , retrieved on Nov. 4, 2014, 2 pages.

Tilley et al., *The Measure of Man and Woman: Human Factors in Design*, John Wiley & Sons, New York, 2002, pp. 74-75.

Anonymous, "Haken Audio, Continuum Fingerboard," 1 page, Retrieved Oct. 5, 2016 from <http://www.hakenaudio.com/Continuum/hakenaudioovervg.html>.

Anonymous, "Introducing the Artiphon Instrument 1, Strum a guitar, bow a violin, tap a piano, loop a beat—on a single instrument. An intuitive way to create music and play any sound," 6 pages, Retrieved Oct. 6, 2016 from <http://artiphon.com/>.

Anonymous, "Laser harp," Wikipedia, 4 pages, Retrieved Oct. 6, 2016 from <https://en.wikipedia.org/w/index.php?title=Laser_harp&oldid=716360999>.

Anonymous, "Linnstrument," 1 page, Retrieved Oct. 5, 2016 from <https://www.rogerlinndesign.com/>.

Anonymous, "Otamatone Digital from Maywa Denki—New Generation Otamatone Keyboard Style (Black)," 2 pages, Retrieved Oct. 5, 2016 from <https://www.amazon.com/Otamatone-Touch-Sensitive-Electronic-Musical-Instrument/dp/B00MRJ8LSU>.

Anonymous, "Seaboard Rise," 2 pages, Retrieved Oct. 5, 2016 from <https://roli.com/>.

Anonymous (2010). "Misa Digital Guitar" 1 page, Retrieved Oct. 5, 2016 from <https://www.youtube.com/watch?v=M2eiP12hQQY>.

Anonymous (2011). "Laser Guitar," 1 page, Retrieved Oct. 5, 2016 from <https://www.youtube.com/watch?v=4CnRsTaShUU>.

Anonymous (2015). "The Sensel Morph: Interaction, Evolved," 14 pages, Retrieved Oct. 5, 2016 from <https://www.kickstarter.com/projects/1152958674/the-sensel-morph-interaction-evolved>.

Sears (2005). "Vibrato—Touch Sensitive Musical Instrument,"

(56) References Cited

OTHER PUBLICATIONS

Retrieved Oct. 5, 2016 from <http://www.jamesnsears.com/2005/12/vibrato_touch_sensitive_musica.php>.

* cited by examiner

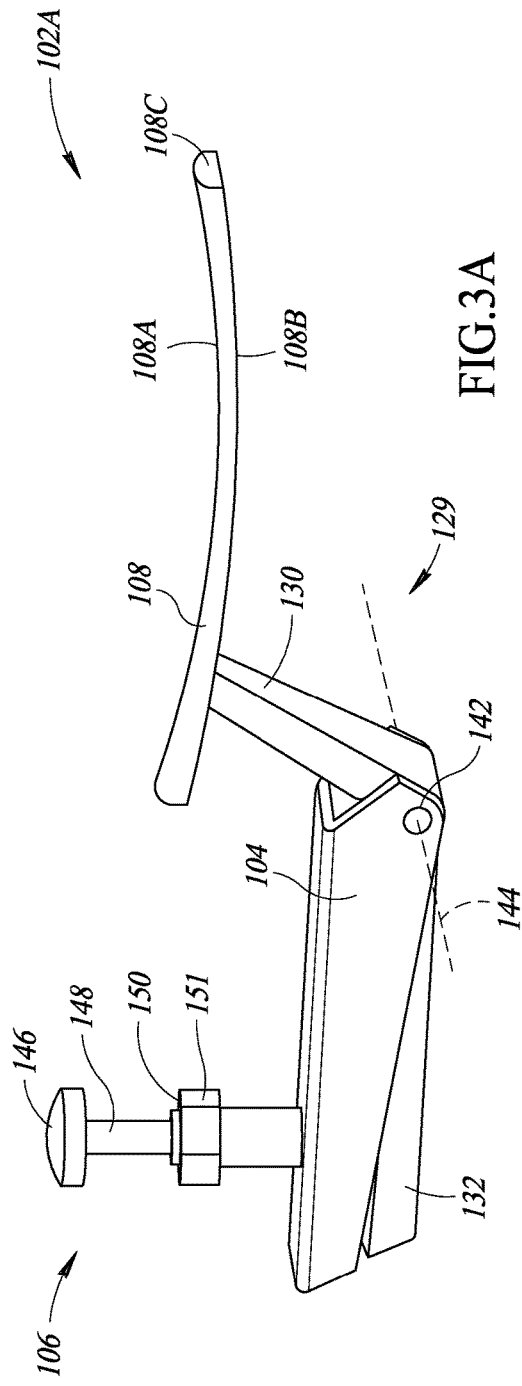
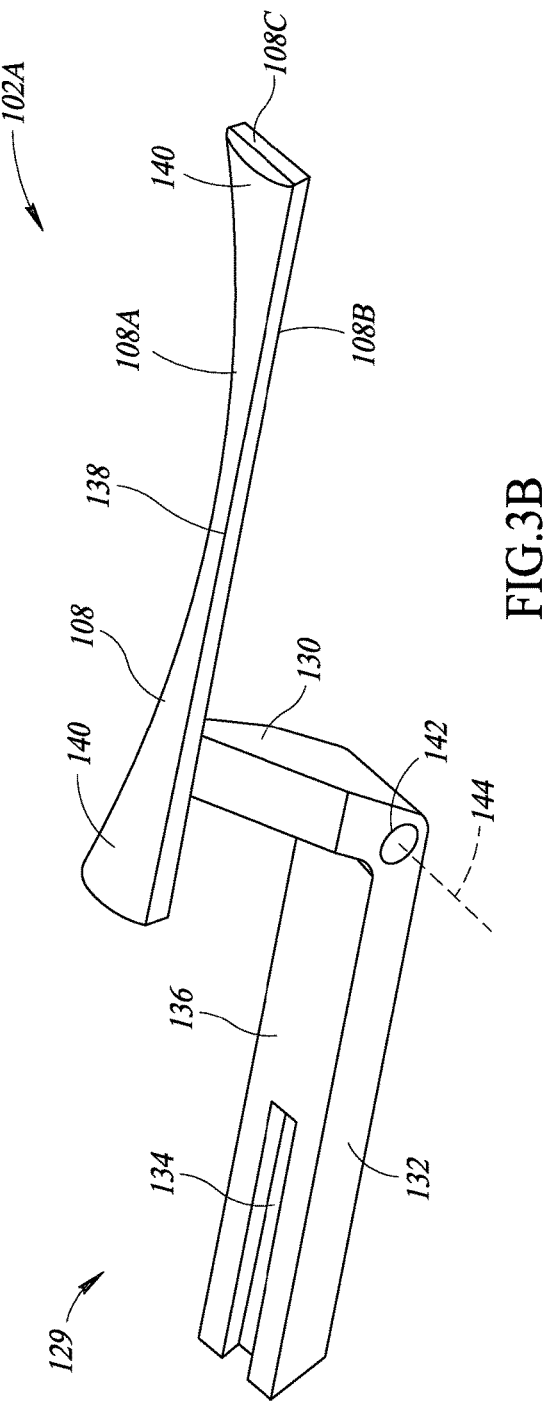
FIG.3A
FIG.3B

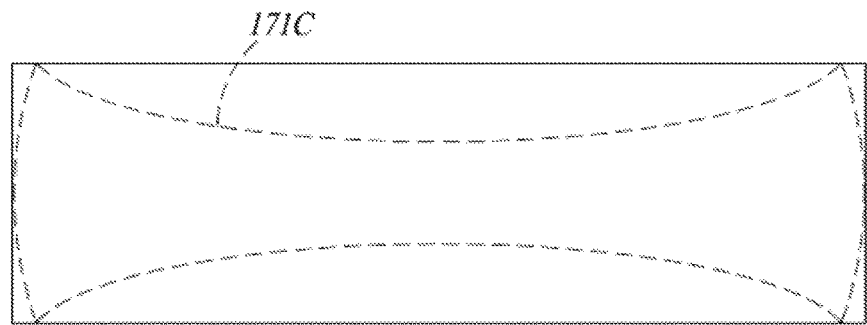
FIG.5C
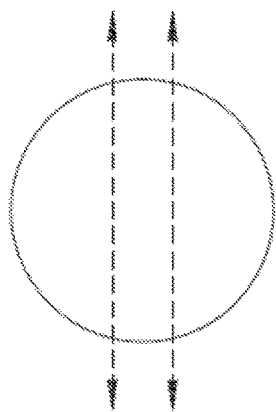 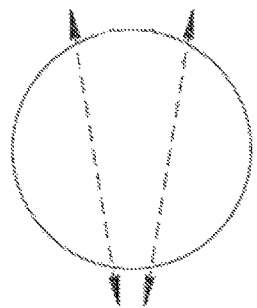 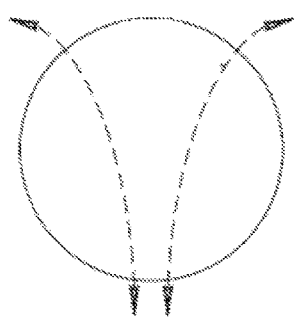
FIG.5D            FIG.5E            FIG.5F

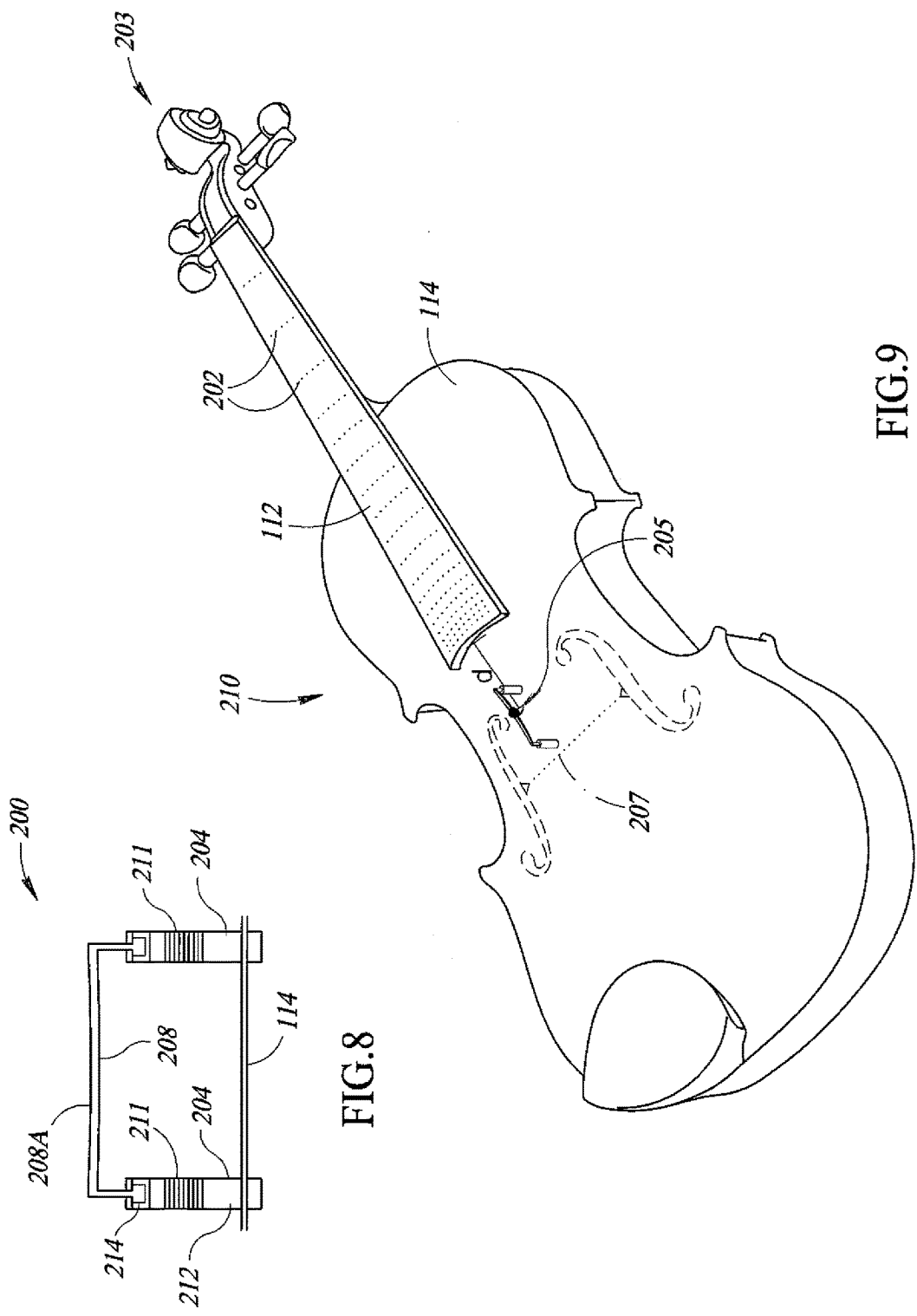

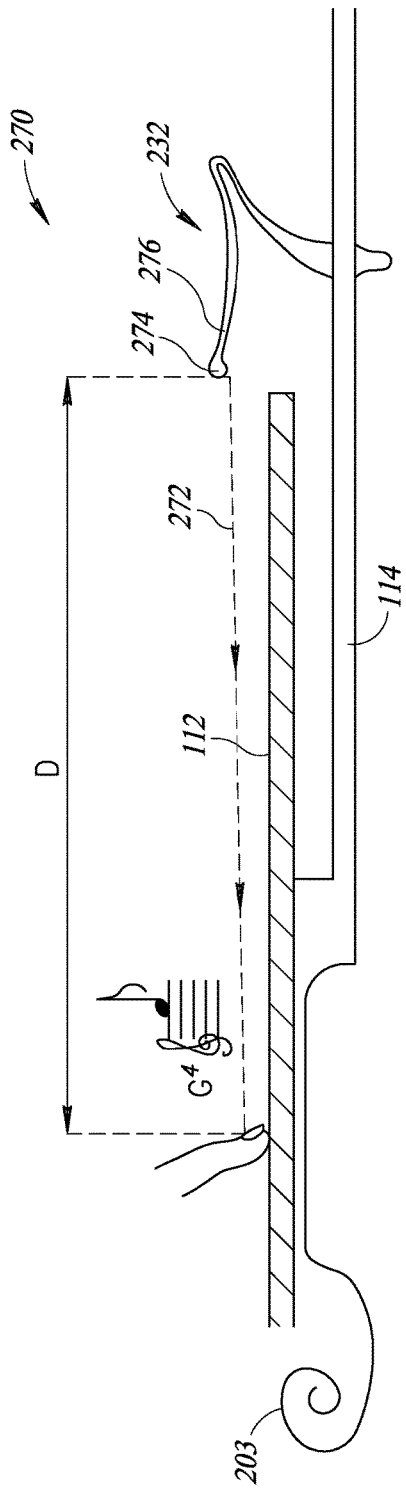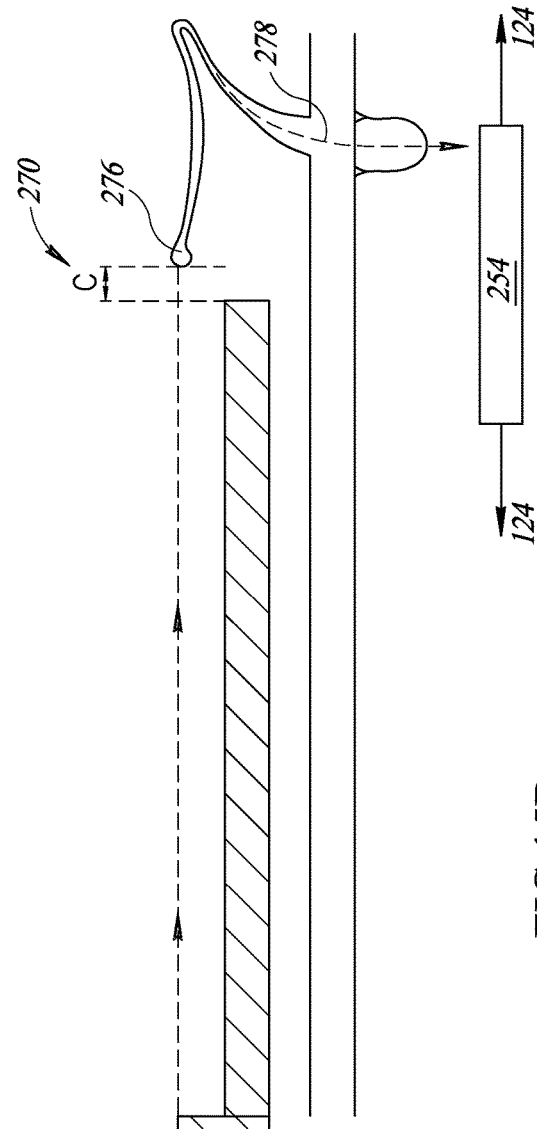
FIG.15A
FIG.15B

STRINGLESS BOWED MUSICAL INSTRUMENT

BACKGROUND

Technical Field

In one aspect, the present disclosure relates to training aids for bowed musical instruments. In another aspect, the present disclosure relates to an apparatus for electronically sensing movements of the player of a bowed musical instrument, and translating the sensed movements into sound without the use of strings.

Description of the Related Art

Players of conventional bowed musical instruments including the violin, viola, cello, and bass gain proficiency, in large part, by learning to control various aspects of bow movement. When a player draws the bow across a string, friction between the bow and the string initiates vibration of the string. The string vibrations are then translated to the top of the instrument via a bridge, causing the instrument to resonate. Thus, the point at which the bow meets the string is an important determiner of sound quality. Another determinant of sound quality is the contact point at which the player's fingertip stops the string vibration on the fingerboard.

Aspects of bow movement include bow pressure, bow speed, bow angle with respect to the bridge, distance from the bridge to the fingerboard, and bow placement along the length of the bow. It is generally desirable for the player of a bowed stringed instrument to maintain a bow angle that is substantially parallel to the bridge and perpendicular to the fingerboard. Developing control of the bow angle is a common source of frustration for beginning players, and even professional string players are challenged to consistently maintain a proper bow angle.

There exist devices to assist players of bowed instruments in developing better control of the bow angle. Typically, such devices, referred to as bow guides, constrain the bow to move in a trough as described in U.S. Pat. No. 1,753,053, or the bow guides present other fixed physical barriers that protrude vertically above the instrument. Some bow guides restrict motion of the bow stick, thereby forcing the player to bow in a straight line. Such devices include, for example, products such as "Bow Right", described in U.S. Design patent No. D322,270, available from www.sharmusic.com, or devices described in International Patent Applications WO1997/043752 and WO1991/005328A1, and U.S. Pat. No. 4,986,792. Such devices are problematic for several reasons. For example, the use of a fixed barrier does not allow for natural arm motion that occurs even when bowing at a proper angle. In addition, such devices can be unsightly, bulky, and awkward. Furthermore, any vibrational device like a bow guide that is in contact with the top of the instrument will tend to produce a sound that is amplified by the body of the instrument. Consequently, bow guides that rest on the top of the instrument may not permit silent practice, and would tend to generate sounds that are even more unpleasant than an uncontrolled string sound. Additionally, such devices do not allow for the use of a valuable bow. As a result, such bow guides are typically only used by beginners, and without enthusiasm.

There also exist "silent violins" which are essentially electric instruments played without optional amplification. However, such models are still equipped with strings which, even without acoustic projection or electric amplification, make at least a faint, but noticeable, sound when they are bowed or when the player's finger strikes the string. Therefore, practice on such an instrument is not truly silent. Silent practice is beneficial for musicians who live in apartment buildings, for example, or for beginners and their families, who might be discouraged by the sounds they are making. Advantageously, there is no dissonance involved in silent practice.

In addition, there exist electric stringed instruments that sense a player's finger position on a fingerboard, such as the devices described in U.S. Patent Application Publication No. 2009/0100992 to Elion and in International Patent Application Publication WO2008/017233 to Fang. A stringless guitar is disclosed in U.S. Pat. No. 4,177,705. A stringless violin has been proposed, but it includes a bulky and restrictive bow guide having motors attached to it to sense and translate bow motion ["Stringless violin to bring feeling to computer music," www.newscientist.com, May 16, 2002].

BRIEF SUMMARY

An apparatus is disclosed for furthering the study of bowed instruments to develop technique, or to create or interpret music. In some embodiments, the apparatus is a musical training aid in the form of a bowing platform designed to assist the player in developing better control of the bow angle while engaging in silent practice. In one such embodiment, the bowing platform can be supplied as an integral, permanently mounted component of a model instrument for use as a training device.

A bowing platform equipped with electronic sensors can be installed on an acoustic or an electric bowed instrument in place of conventional strings and fittings to create a stringless bowed electric instrument. In the case of such a stringless electric violin, the bowing platform can create a synthesized string sound in response to a player's bow arm movement, while a customized fingerboard is additionally configured with pitch sensors for producing sound at different frequencies in response to the player's left hand movement. Alternatively, the bowing platform can include the pitch sensing devices, for use with a conventional fingerboard.

In other embodiments, a bowing platform can be installed on a conventional instrument between the strings and adjacent to the bridge without removing the fittings, and in a non-destructive fashion. For example, the bowing platform can be mounted to the fingerboard, or within a semi-flexible material that wraps around the body of the instrument. Additionally or alternatively, one track, or a plurality of tracks, can be stabilized within a soft support structure, for example, foam, for mounting onto a conventional instrument without damaging the body of the instrument or the conventional setup.

In still other embodiments, the bowing platform can replace some or all of the fittings on a conventional bowed acoustic or electric stringed instrument—the pegs, strings, fine tuners, tailpiece, and bridge. In this way, a conventional violin can be converted to a stringless violin.

Various embodiments of the bowing platform itself are possible; however, the bowing platform includes at least a support and a track. In some embodiments, the support removably attaches to the fingerboard through an opening that can be plugged when not in use. In other embodiments, the support removably attaches to the body of the instrument. Alternatively, the support can be an extension of the fingerboard itself, or the support can be permanently attached to either the body or the fingerboard. The structure of the support can take on different forms and can be made of different materials. For example, in one embodiment, the support is a pair of legs that are mounted substantially perpendicular to the top of the instrument. In another embodiment, the support is a cantilevered pedestal suspended over the top of the instrument, attached to the top of the instrument at a single point. Such a cantilevered pedestal has inherent spring tension and can respond to variations in bow pressure. Alternatively, springs can be added to support legs to achieve a similar response.

The track provides a substantially horizontal bowing surface on which the player rests the bow. For example, the surface of the track may be parallel to the ground, or slightly slanted with respect to the ground. The player then bows the track instead of bowing strings. The track provides a bowing surface to the player that limits the range of bow angles without unnaturally constraining the player's arm motion. The track trains the player to maintain bow control, or the bow will fall off the track, thus providing negative feedback to the player. In this way, the track exercises and trains players of bowed instruments to bow in linear or slightly curved paths within a maximum range of about 30-60 mm on a full size violin. The length of the track is desirable about 43 mm with about 8.5 mm of open space on either end of the track. While a traditional stringed instrument is playable using a poor bow angle that can vary by much more than 60 mm, the track does not allow the player such freedom. Unlike conventional bow guides, however, the track described herein does not limit or confine bow movement within a narrow channel through the use of a physical barrier and would not damage a valuable bow. Other than the track, there are no other artificial parts, obstructions, or interferences with the player's natural movement. Yet, the apparatus guides and conditions the player's bow arm movement to maintain the mechanics of correct bow arm movement used when playing conventional stringed instruments. Consequently, the present invention engages the right arm with the bowing platform and simultaneously allows the fingers of the left hand to move freely along the entire surface of the fingerboard. Through use of the disclosed bowing platforms, the player learns proper movement and can improve balance and mobility.

The track is desirably flexible and offers resistance to the bow, in place of the resistance presented by strings under tension. The track is manufactured and mounted so as to vibrate freely in response to the player's bowing, and therefore effectively replaces the strings and the bridge as the primary resonating component of the instrument. The bowing surface may have a slightly concave shape that forms a well to further guide the bow. Furthermore, when the track is properly aligned, the concavity of the track assists a player in bowing along an axis located at a desirable distance away from the fingerboard.

A plurality of tracks can be used together to correspond to strings of a conventional instrument. For example, a five-track apparatus corresponds to a conventional five-string electric violin having an extended range that includes both the violin and viola ranges. Such multi-track embodiments can be formed with a single support connecting multiple independent bowing surfaces, or as independent units in which each track has its own support. Alternatively, the surface of the track may be a planar surface, substantially parallel to the top of the body 114, the planar surface having a vertically concave saddle-like shape overall, to guide bow movement, or a convex shape that mimics the arch of a conventional bridge and string setup.

With the addition of sensors mounted in the fingerboard and track vibration sensors, the bowing platform becomes a fundamental component of a stringless electric violin. Sensors may be provided for each track to detect bow movement for purposes of providing information to the player, or for synthesizing sound. In the case of a planar track, the track itself may be made touch-sensitive so as to detect a radial bow placement angle and to interpret the radial angle as corresponding to a string position on a conventional instrument.

Embodiments disclosed herein apply equally to all bowed instruments, including the violin, viola, cello, bass, gamba, other baroque-style stringed instruments, the Chinese erhu, and the like, as well as electric instruments. The present description refers to the violin and to violin players as examples, but the embodiments described can be scaled for use with at least any of the aforementioned musical instruments and musical instrument models thereof. Through use of the embodiments disclosed, both the player's and the audience's experience of the art of music can be enhanced.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are enlarged and positioned to improve drawing legibility.

FIG. 3A is a perspective view of a flexible bowing platform having a support, a three-segment moveable track, and hardware for attachment to a fingerboard, according to one embodiment described herein.

FIG. 3B is a perspective view of the moveable track portion of the flexible bowing platform shown in FIG. 3A.

FIGS. 5B and 5C are plan views of an elongated bar after sectioning the annular tube shown in FIG. 5A, in which dotted lines indicate various choices for cross-sectional cuts as described herein.

FIGS. 5D-5F are sectional views of an elongated bar after sectioning the annular tube shown in FIG. 5A, in which dotted lines indicate various choices for shaping a concave bowing surface.

FIG. 8 is a side elevation view of a bracket style bowing platform that mounts directly to the top plate of a musical instrument, according to one embodiment described herein.

FIG. 9 is a perspective view of a bracket violin, according to one embodiment described herein.

FIG. 15A shows a side elevation view of a stringless violin equipped with a cantilevered bowing platform and an optical pitch sensor, according to one embodiment described herein.

FIG. 15B illustrates a method of calibrating the optical pitch sensor shown in FIG. 15A.

DETAILED DESCRIPTION

It will be appreciated that, although specific embodiments of the present disclosure are described herein for purposes of illustration, various modifications may be made without departing from the spirit and scope of the present disclosure. Accordingly, the present disclosure is not limited except as by the appended claims.

In the description, certain specific details are set forth in order to provide a thorough understanding of various aspects of the disclosed subject matter. However, the disclosed subject matter may be practiced without these specific details. In some instances, well-known structures and methods comprising embodiments of the subject matter disclosed herein have not been described in detail to avoid obscuring the descriptions of other aspects of the present disclosure.

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Figure 1:
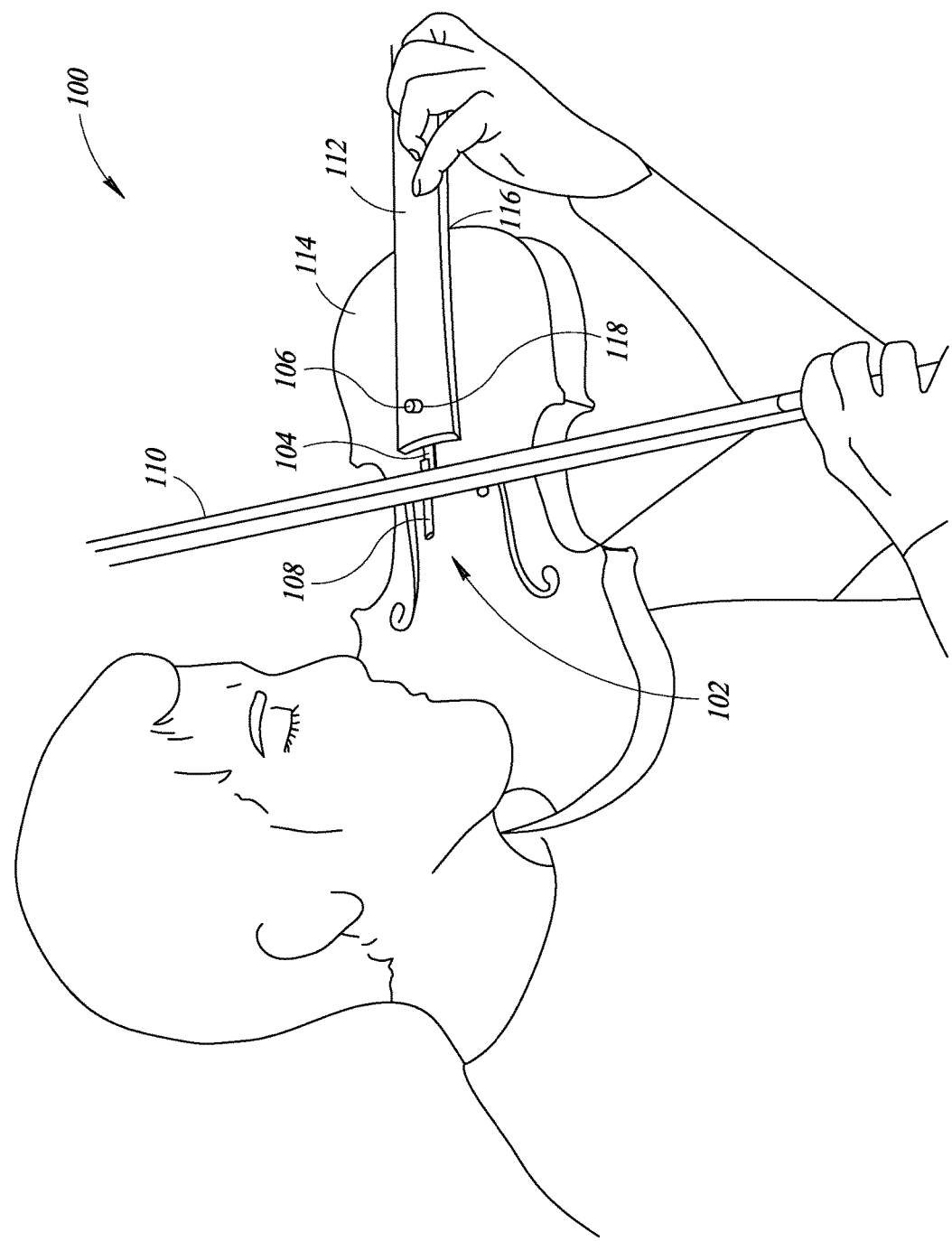
FIG. 1 is a pictorial view of a stringless bowed musical instrument, equipped with a bowing platform that attaches to the fingerboard, according to one embodiment described herein.
Figure 2:
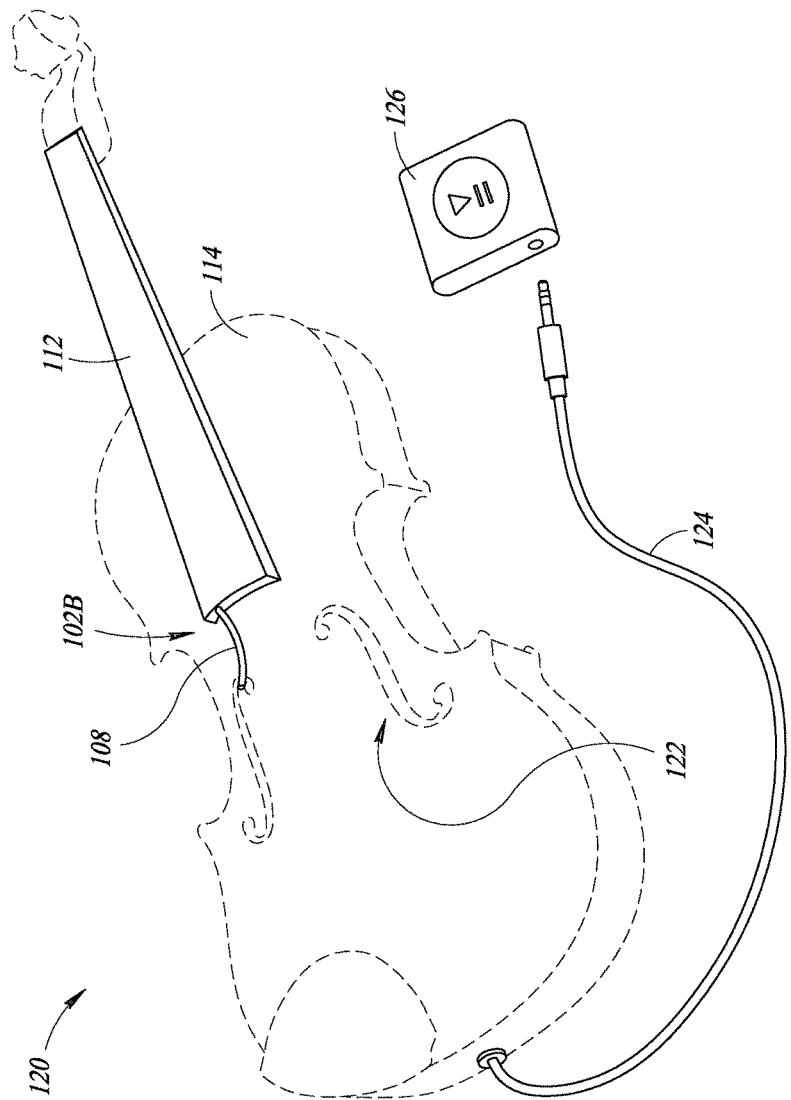
FIG. 2 is a pictorial view of a stringless bowed musical instrument equipped with a bowing platform that attaches to the fingerboard and sensors for generating sound, according to one embodiment described herein.

FIGS. 1 and 2 show embodiments of a stringless bowed musical instrument 100 that resembles a traditional violin. Customary fittings that would otherwise be needed to accommodate strings, e.g., tuning pegs, bridge, tailpiece, fine tuners, endpin, and the strings themselves, are replaced with a bowing platform 102 that provides an alternative bowing surface. The bowing platform 102 includes a support 104, mount 106, and an elongated bar 108 having a bowing surface to receive a bow 110. In the embodiment shown in FIG. 1, the mount 106 attaches the support 104, permanently or removably, to a conventional fingerboard 112. When the stringless bowed musical instrument 100 is equipped with electronic sensors, as described below in further detail, it operates as a stringless electric violin capable of generating sound that can be realized with speakers or headphones.

Without sensors, the stringless bowed musical instrument 100 operates as a silent violin that is useful for general practice. In particular, the stringless bowed musical instrument 100 is useful as a bowing platform for developing and improving bowing technique by assisting the player to move the bow in a substantially straight line at a desirable distance away from the proximal end of the fingerboard 112. The proximal end of the fingerboard 112 is the end closest to where the bridge would normally be placed. Bow motion is guided by the design of the bowing platform 102 such that when the player moves the bow along an axis that is not substantially perpendicular to the fingerboard 112, the bow will fall off the track. For example, use of a poor bow angle may cause the bow to fall forward into an open space between the track and the fingerboard. Alternatively, the underlying support 104 may catch and stop the bow as it falls off the bowing platform 102, thus protecting the top of the instrument from damage. In addition, bow placement relative to the end of the fingerboard can be trained using a concave bowing surface.

The conventional fingerboard 112 is attached in the usual way to a body 114 where the body 114 joins the neck at a neck joint 116. About half the length of the fingerboard 112 is joined to the neck while the other half extends over a portion of the body 114, rising toward the player at a slight angle. Consistent with a conventional violin fingerboard, the fingerboard thickness is about 5 mm, having an arched profile. The fingerboard 112 is tapered at the distal end to about half its width at the proximal end. In a silent embodiment, the body 114 is a conventional violin body that can be custom made or adapted for use with the bowing platform 102. Thus, the mount 106 can include, for example, a threaded screw or pin that attaches the support 104 to the fingerboard 112 through an opening 118 in the proximal end of the fingerboard 112. While it is generally undesirable to modify the top of the instrument body 114 to attach the bowing platform 102, modifying the proximal end of the fingerboard 112 instead is relatively non-invasive to a conventional instrument having a normal sound-producing setup. Modifying the fingerboard 112 can be done by drilling a hole, about 6 mm in diameter, near the proximal end. Alternatively, a separate stringless instrument can be made with a bowing platform 102 mounted to the fingerboard or the top plate of the instrument body 114, or made integral to the fingerboard or the top plate of the instrument body 114.

In an electronic embodiment of the stringless bowed musical instrument 100, the body 114 merely provides a general structure for bowing and fingering, similar to an electric violin body. Such a structure can be made in a wide variety of shapes and materials, because it need not provide a resonant cavity for projecting sound. Such a structure may take on a minimalist shape that need not resemble a traditional viol shape at all, as is already customary in the art of electronic bowed instruments. An electronic embodiment of the stringless bowed musical instrument 100 can be custom made with a bowing platform 102. Alternatively, some electronic instruments can be adapted for use with the bowing platform 102.

FIG. 2 shows one embodiment of an electronic stringless bowed musical instrument 120, in which the bowing platform 102B features a unitary support/elongated bar 108 that mounts to a proximal end of the fingerboard 112. For example, the bowing platform 102B can mount to the proximal end of the fingerboard 112 using a clip, a clamp, a magnet, or another suitable attachment device. Micro-sensors integral to the fingerboard 112 and the bowing platform 102 are capable of generating sensor signals responsive to bow pressure applied to the elongated bar 108 and finger pressure applied to a top surface of the fingerboard 112. The micro-sensors generate electrical sensor signals that are transmitted by a wired or wireless signal path to electronic components 122 hidden inside the body 114, or located outside the body 114, for example, in a mobile electronic device or in a nearby computer. The electronic components 122 then process the sensor signals and generate an output signal 124 for transmission by an output line to a sound-producing device as is known in the art. The output line carrying the output signal 124 can be similar to a conventional output line that plugs directly into the body of an electric violin. Alternatively, the output line can be similar to a conventional output line that conveys electrical sensor signals from an electric violin or an electronic pickup installed on an acoustic violin. The output signal 124 can then be coupled to a controller 126. In one embodiment, the controller 126 is programmed to direct an output signal to an amplifier and speaker setup, as is typically done in existing sound systems used for live performances of amplified music.

Figure 3C:
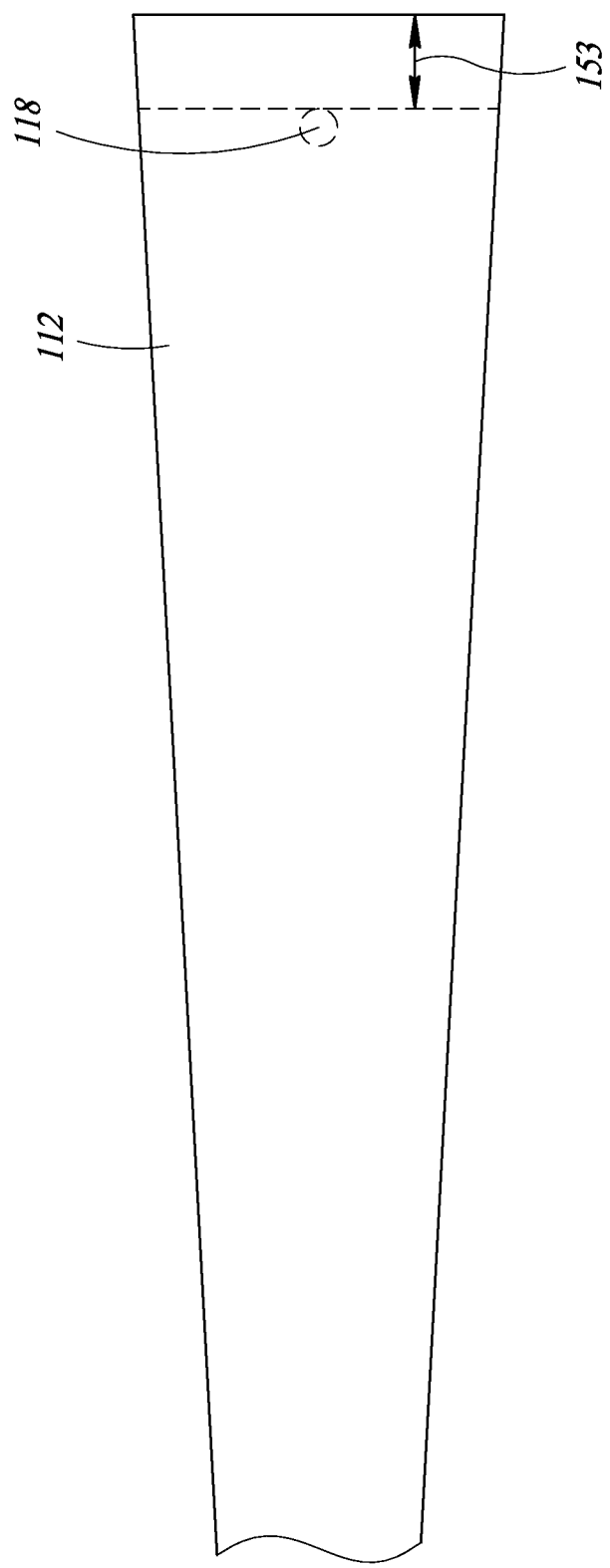
FIG. 3C is a top plan view of a fingerboard in which an opening is formed to accept hardware for attaching a bowing platform.

FIGS. 3A and 3B show magnified perspective views of a flexible bowing platform 102A. The flexible bowing platform 102A includes a support 104 that acts as a fulcrum, a moveable track 129, and the mount 106. The moveable track 129 in turn includes three segments—a vertical member 130, a tail portion 132, and the elongated bar 108. FIG. 3B shows a perspective view of the three-segment moveable track 129 alone, without the support 104. A groove 134 can be cut into a top surface 136 of the tail portion 132 of the track to accommodate vertical translational movement of the mount 106. The groove 134 optionally can be lined with a soft or resilient material. The elongated bar 108 has a concave bowing surface 108A, a flat underside surface 108B, and a hemispherical end profile 108C. The elongated bar 108 may have a narrow center 138 and flared ends 140 as shown in FIG. 3B. A hinge 142 is positioned at a junction of the tail portion 132 and the vertical member 130, thus allowing the three-segment track 129 to rotate, relative to the support 104, around an axis 144 through the hinge 142, in response to bow pressure being applied to the bowing surface 108A. The hinge 142 can be, for example, a pin hinge. The bowing platform 102A is desirably made of a substantially rigid material such as, for example, metal, wood, fiberglass, glass, carbon fiber, plastic, stone, crystal, or combinations thereof. In one embodiment, the mount 106 includes a screw head 146, a screw shaft 148, a barrel 150 lining the inside of the opening 118 in the fingerboard 112, and a nut 151. The screw shaft 148 can be threaded, in which case an inside surface of the barrel 150 is also threaded. FIG. 3C shows the opening 118 formed at a short distance 153 from a proximal end of the fingerboard 112.

As the player draws a bow along the bowing surface 108A, the elongated bar is free to vibrate, however, no sound is produced acoustically because, due to the fingerboard mount 106, the vibrations or the elongated bar 108 are not transferred to the instrument body 114, which normally provides a sounding box to amplify vibrations in the top surface of the instrument body 114. Hence, the flexible bowing platform 102A allows the player to engage in silent practice of bow mechanics. If desired, sound can be produced electronically as described below with the use of electronic pickups, e.g., transducers.

Figure 4A:
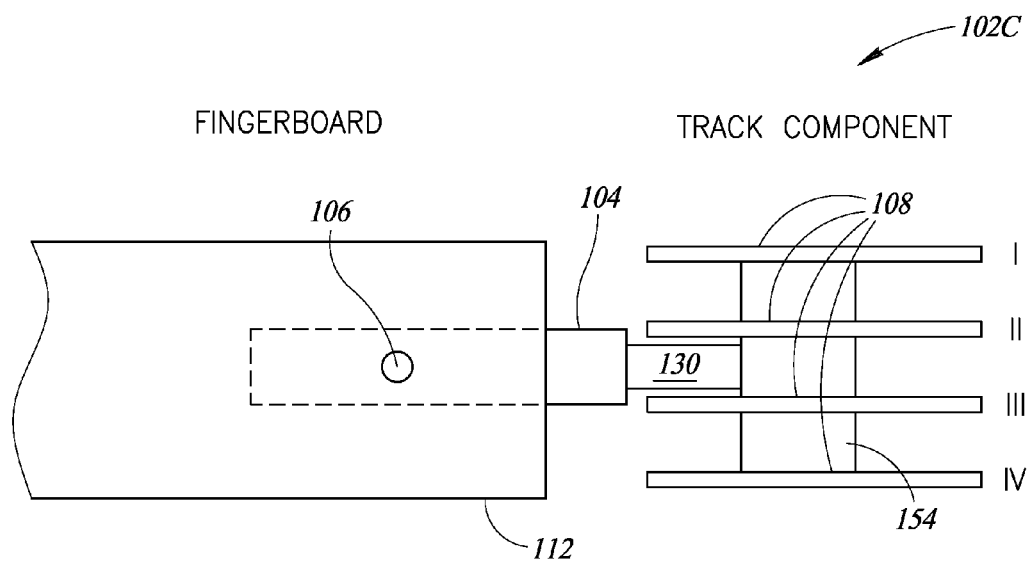
FIG. 4A is a top plan view of a fingerboard and track component of a bowing platform having a single support mounted to the fingerboard and a plurality of bowing surfaces, according to one embodiment described herein.
Figure 4B:
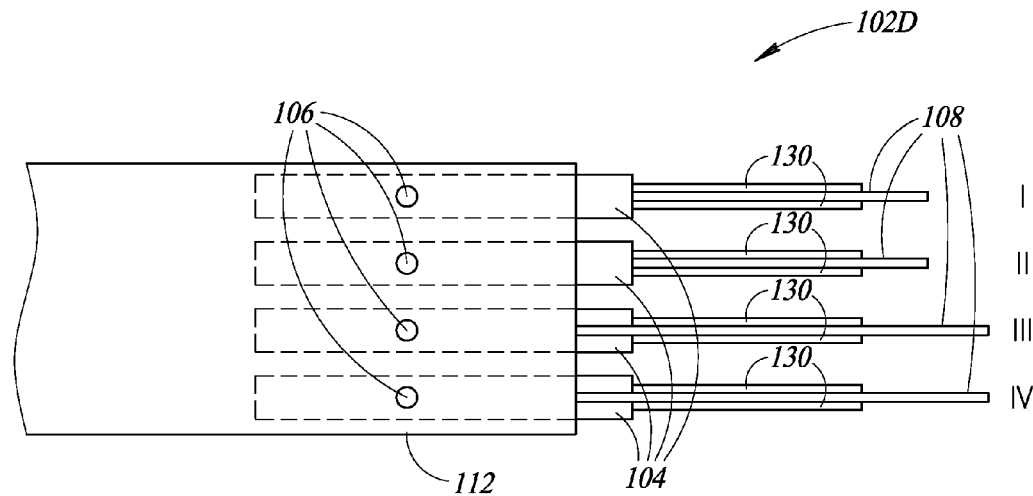
FIG. 4B is a top plan view of a fingerboard and track component of a bowing platform having a plurality of supports mounted to the fingerboard and a plurality of bowing surfaces, according to one embodiment described herein.

FIGS. 4A and 4B show two exemplary alternative embodiments of the bowing platform 102, —102C and 102D—each of which features a plurality of elongated bars 108, corresponding to strings I-IV on a conventional bowed instrument such as a violin, viola, cello, or bass. The elongated bars 108 can have various forms as well. FIG. 4A shows the bowing platform 102C having a single support 104 and a vertical member 130 to which four separate substantially parallel bowing surfaces 108A are attached via a flange 154. The flange 154 is curved to match the curvature of the fingerboard 112 or the curvature of a conventional bridge 174 so as to permit independently bowing the bowing surfaces 108A. Like the previous embodiments shown, a portion of the support 104 extends underneath the fingerboard 112 for attachment through the opening 118 using the mount 106. The elongated bars 108 can be rectangular as shown, or they can have a different shape, such as, for example, a tapered triangular shape. When a plurality of elongated bars 108 is employed, the bowing platform can include any number thereof that can be accommodated by the fingerboard 112. FIG. 4B shows the exemplary bowing platform 102D in which each of four elongated bars 108 couples to a separate support 104 via a vertical member 130. The elongated bars 108 can extend close to the fingerboard e.g., as shown for bowing surfaces I and II, or the elongated bars 108 can extend up to or beyond the fingerboard 112, as shown for bowing surfaces III and IV. The separate supports 104 are then mounted independently to the fingerboard 112 through separate openings 118 via separate elements of the mount 106. By virtue of the curvature of the fingerboard 112, the elongated bars 108 are not co-planar and therefore can be bowed independently.

Figure 5A:
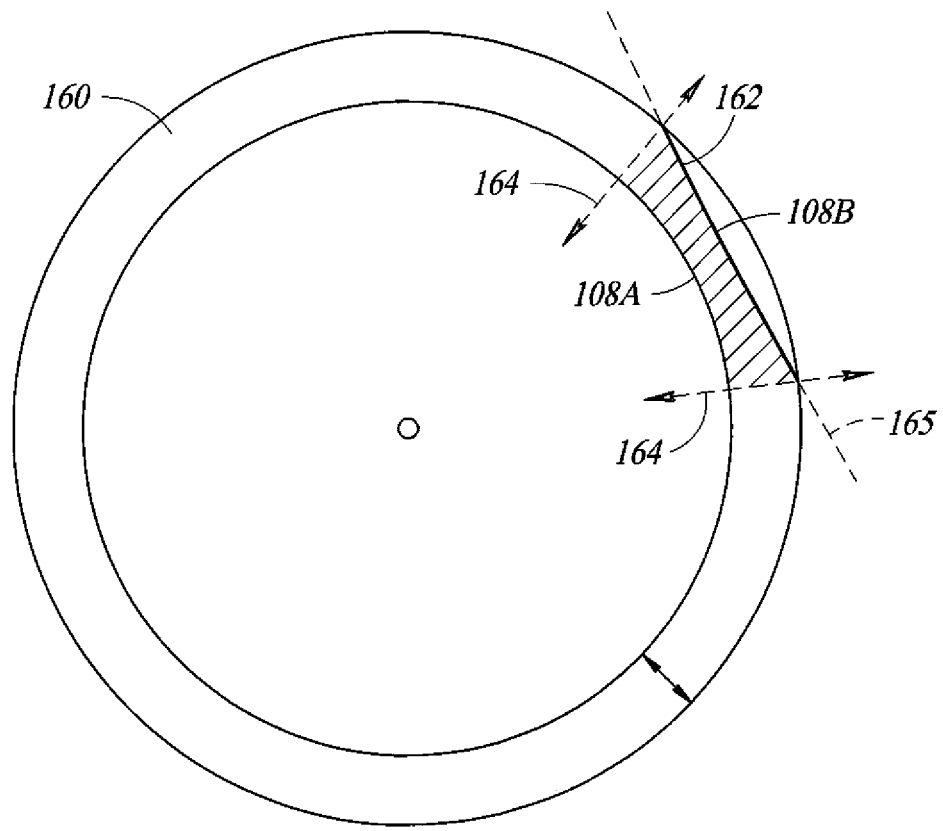
FIG. 5A is a plan view of an annular tube from which an elongated bar can be cut for use as a bowing surface, according to one embodiment described herein.
Figure 5B:
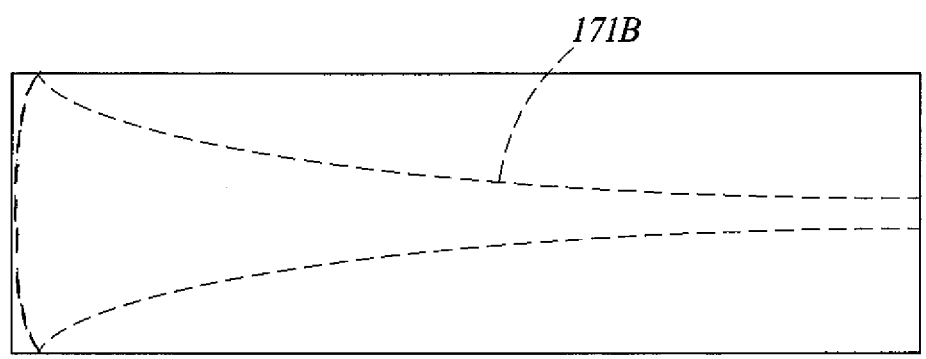

FIGS. 5A-5F outline a method of fashioning the elongated bar 108 shown in FIGS. 3A-3B, according to one embodiment. FIG. 5A shows an annular tube 160, from which the elongated bar 108 can be sectioned as follows: First, a section is made along a chord 162 of the annular tube 160 along an axis 165 to form the surface of the underside of the elongated bar 108B. The inside curved surface of the annular tube 160 forms the bowing surface 108A. The chord 162 is selected according to the desired length of the elongated bar 108, which is typically in the range of about 30-60 mm for a full size violin. Radial sections 164 then form the end profiles, e.g., 108C. After releasing the elongated bar 108 from the annular tube 160, the elongated bar 108 can rest on the flat underside surface 108B. Next, concave sides of the elongated bar 108 can be shaped according to the profiles 171B and 171C shown in FIGS. 5B and 5C, respectively. Narrowing the sides of the elongated bars in this way provides additional guidance for bow movement as the player's bow arm is raised and lowered, while preserving an arched or round-over bowing surface as exemplified in 108C. FIGS. 5D, 5E, and 5F show various alternative lengthwise cuts that can be made to form different lateral side cut profiles. It is noted that some or all of the steps described above for manufacturing the elongated bar 108 can be performed in a different order than is described above.

Figure 6A:
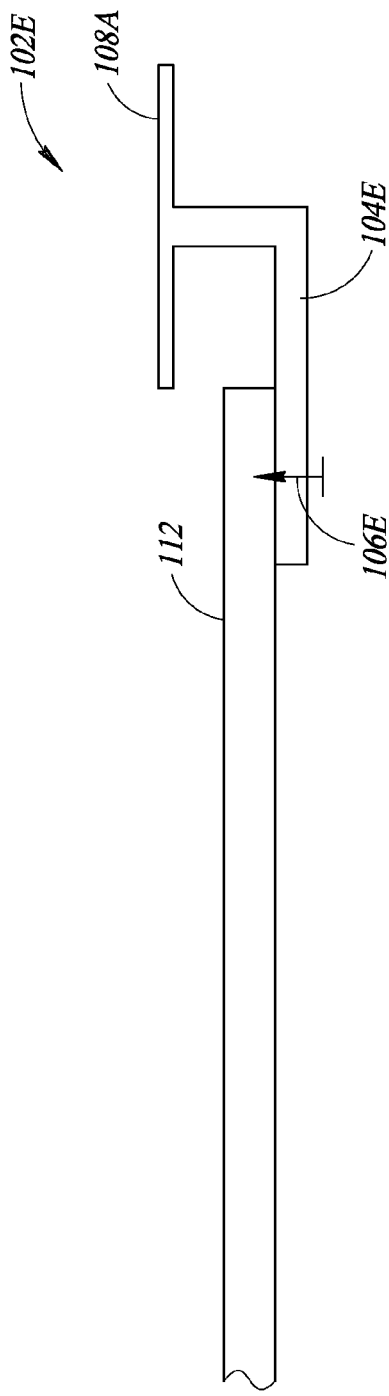
FIGS. 6A and 6B are side elevation views of unitary designs of bowing platforms that are mounted to a fingerboard, according to embodiments described herein.
Figure 6B:
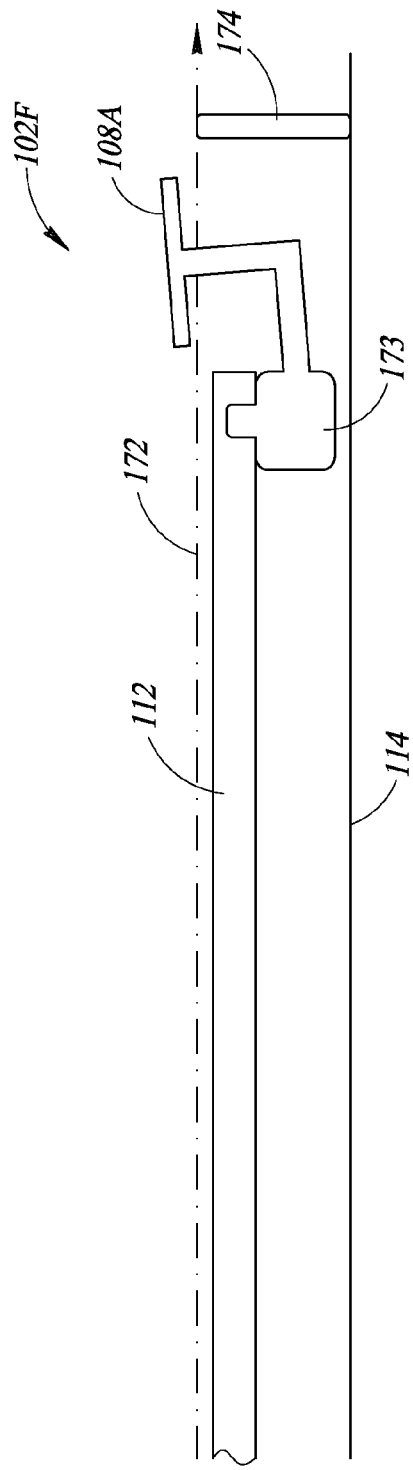

FIGS. 6A and 6B show two exemplary embodiments 102E and 102F of a bowing platform having a unitary structure. The unitary bowing platform 102E is an alternative to the three-component bowing platform, with a fixed single component having a fixed support portion 104E that extends underneath the fingerboard 112 for permanent or removable attachment to the fingerboard 112 by a mount 106E. The mount 106E can be in the form of hardware or a strong adhesive. The unitary bowing platform 102E is generally simpler to design and mount than is the bowing platform 102A. However, the unitary design of the bowing platform 102E lacks the flexibility afforded by a bowing platform design such as 102A in which the track moves relative to the support 104. Furthermore, the types of sensors compatible with the unitary bowing platform 102E may be limited because the unitary bowing platform 102E remains fixed relative to the fingerboard 112. Thus, a pressure sensor may be used to sense bow motion on the unitary bowing platform 102E, while a displacement sensor may not be used. FIG. 6B shows an alternative type of unitary bowing platform 102F that can be used as a training tool in conjunction with a normal violin setup including strings 172 and a bridge 174. In such an arrangement, the bowing surface 108A is positioned slightly above the height of the strings 172. The unitary bowing platform 102F mounts to the fingerboard 112 via a mount 173 that hugs the edges of the fingerboard from underneath, thus not requiring modification of the fingerboard 112. The mount 173 desirably remains above the top of the instrument body 114. However, a mount 173 made of a compressible, resilient material such as rubber, for example, which would absorb and damp vibrations, may contact the top of the instrument body.

Figure 7A:
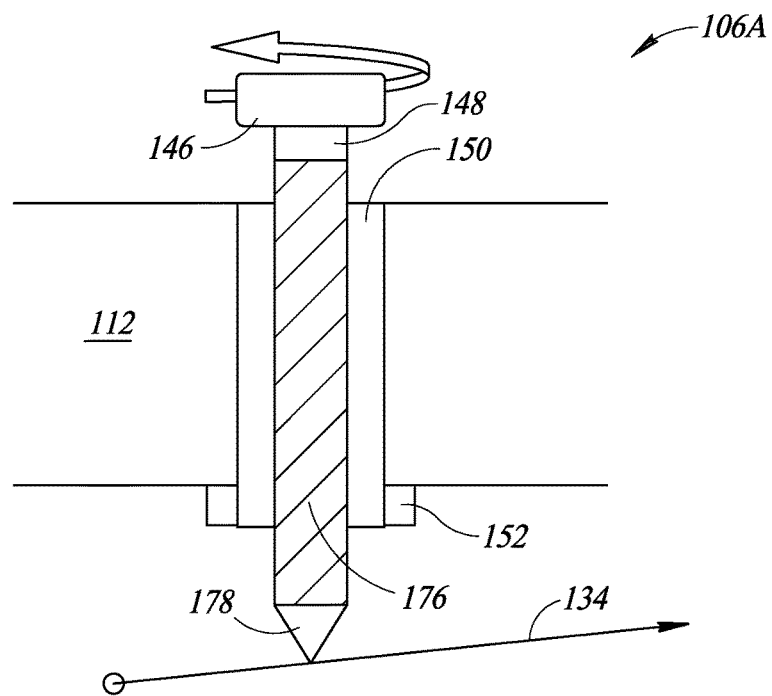
FIG. 7A is a cross-sectional view of hardware for use in securing a bowing platform to a fingerboard, according to one embodiment described herein.

FIG. 7A shows in greater detail the mount 106 for use in securing various bowing platforms described herein to the fingerboard 112. One embodiment, 106A, employs a turning screw. The shaft 148 of the turning screw has outer threading 176 to screw into the barrel 150, having corresponding inner threading. A bottom end of the shaft 148 has a conical tip 178 that can be received by the groove 134 when the shaft 148 reaches its maximum extent of travel into the barrel 150. An underside of the fingerboard 112 rests against a barrel stop 152. Alternatively, variations of the turning screw hardware may be used in which, for example, the hardware is mounted to the wall of the opening 118, or to the underside of the fingerboard 112. When the mount 106 is not in use, a plug can be inserted into the opening 118 in the fingerboard 112. The plug may be made of wood, plastic, rubber, or a similar suitable material that will conform to the size and shape of the opening. Alternatively, when the mount 106 is not in use, the opening 118 can be plugged by the turning screw, which can be tightened all the way so that the screw head 146 is flush with a top surface of the fingerboard 112.

Figure 7B:
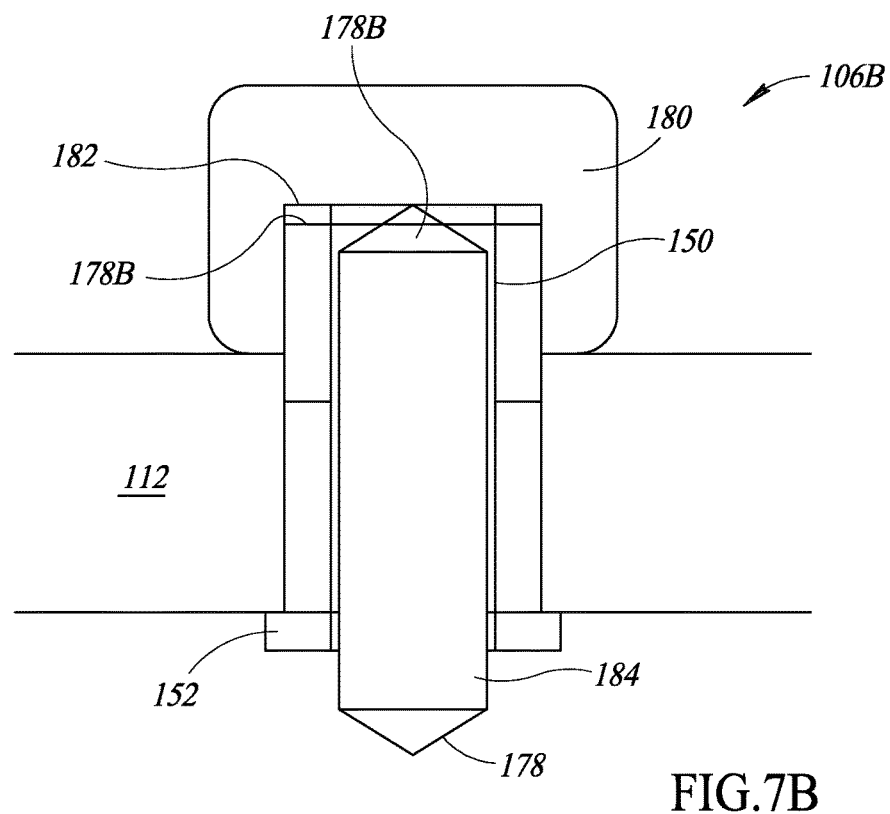
FIG. 7B is a cross-sectional view of a piezoelectric bow motion sensor for use with a bowing platform that mounts to a fingerboard, according to one embodiment described herein.

FIG. 7B shows an alternative embodiment of the mount, a piezoelectric transducer 106B, that generates an electrical signal in response to bow motion. The piezoelectric transducer 106B includes, in addition to the parts of mount 106A, a cap 180, an optional seal 182, for example an O-ring. The cap 180 can be made of a piezoelectric material, e.g., a crystal, piezoelectric plates, or certain ceramics. Instead of a threaded turning screw, the piezoelectric transducer 106B can be equipped with a free pin 184. The free pin 184 has a conical tip 178B at its upper end in addition the conical tip 178 at its lower end.

In response to bow pressure on the bowing surface 108A, rotational motion of the track 129 about the axis 144 exerts an upward force on the conical tip 178 which is maintained in contact with the groove 134. The upward force causes the free pin 184 to move a short distance vertically relative to the barrel 150, similar to the motion of a piston inside a cylinder. As the free pin 184 moves upward, the conical tip 178B exerts pressure on the cap 180, causing crystal planes within the cap material to vibrate. Pressure against the crystalline material transfers mechanical vibrations of the elongated bar to the piezoelectric crystal. By the piezoelectric effect, compression of the crystal planes then results in a charge separation within the crystal, and an associated internal electric field. The piezoelectric transducer 106B is thus capable of converting mechanical energy associated with motion of the track 129 to an electrical signal, thus acting as a bow sensor.

If the barrel 150 is filled with a small volume of pressurized gas, e.g., pressurized air, the upward force on the free pin 184 will compress the gas against the seal 182, thus exerting an additional force on the cap 180. The effect of the gas compression is to amplify mechanical forces exerted on the piezoelectric material, thus increasing sensitivity of the bow sensor. Such a sensor can be referred to as a pneumatically enhanced piezoelectric transducer.

FIGS. 8 and 9 show an alternative embodiment of a bowing platform, a bracket 200, that attaches directly to a top plate of the instrument body 114. The bracket 200 includes supports 204, e.g., a pair of vertical legs, and a track 208 having a bowing surface 208A to receive a bow. The bracket 200 is desirably placed so that a midpoint 205 of the bowing surface 208A is located at a distance d from the proximal end of the fingerboard. The midpoint 205 is desirably located halfway between the proximal end of the fingerboard 112 and an axis 207 that corresponds with the usual location of the bridge 174. Installation of the bracket 200 entails drilling openings into the top of the instrument body 114 so that the supports 204 extend through the instrument body 114 and can be secured underneath the top plate. Because clamping the top plate with hardware interferes with resonance of the top plate, sound is not properly produced or amplified by the instrument body 114. A conventional bowed instrument would thus be compromised by installing the bracket 200. For this reason, it is envisioned that the bracket 200 is installed on, or integrally made a part of, a separate instrument, e.g., a bracket violin 210 as shown in FIG. 9, intended for use as a practice tool. Alternatively, a stringless electric violin can be made with a bracket-style bowing platform, by equipping the supports 204 with a transducer similar to the piezoelectric transducer described herein.

Ergonomics of a stringless practice instrument can be further augmented by an apparatus that permits the fingerboard 112, the neck, and the scroll to pivot relative to the instrument body 114. Such an apparatus may be useful as an aid for music therapists for use in assisting students who have difficulty positioning the instrument body 114.

The bracket 200 shares characteristics of the fingerboard-mounted bowing platform embodiments described above. For example, the track 208 can be concave to further guide placement of the bow relative to the fingerboard 112. The height of the track 208 can be raised or lowered by adjusting thumbscrews 211. In one embodiment, the track 208 is fixed relative to the supports 204. In one embodiment, the track 208 and the supports 204 form a unitary structure. A single bracket 200 may be approximately aligned with the center of the fingerboard 112, or the bracket may be slightly off center to correspond with the usual position of the violin 'A' string, for example. In other embodiments of the bracket violin 210, a plurality of brackets 200 can be used to simulate additional strings, wherein the brackets 200 can be height-adjusted to form an arch that follows the arch of the fingerboard 112 or the arch of a conventional bridge 174.

In some embodiments, one or both of the supports 204 are fashioned as hollow barrels, e.g., 212, allowing vertical movement of the track 208 relative to the supports 204. In response to pressure exerted by the bow on the bowing surface 208A, a free pin 214 can move vertically inside the barrel 212. The barrel 212 may be equipped with an internal spring that is compressed in response to motion of the free pin 214. Alternatively, the barrel 212 may contain a small volume of a gas that is compressed by motion of the free pin 214. Such motion may be detected by a bow sensor in the form of piezoelectric device mounted inside the barrel 212, or underneath the top plate of the instrument body 114.

FIG. 9 also includes pitch indicators 202 associated with different finger locations on the fingerboard 112. The pitch indicators 202 are not actual frets. Instead, the pitch indicators are imaginary lines located at the finger positions of various musical notes on the fingerboard 112. As is understood by those skilled in the art of bowed instruments, finger locations for creating successive musical notes become closer together at the proximal end of the fingerboard, closer to the player, and farther apart at the distal end of the fingerboard 112, closer to a scroll 203. When the bracket violin 210 is thus equipped with a bow sensor and sensors for finger placement along the fingerboard 112, the bracket violin 210 constitutes another embodiment of the stringless bowed musical instrument 100.

Figure 10:
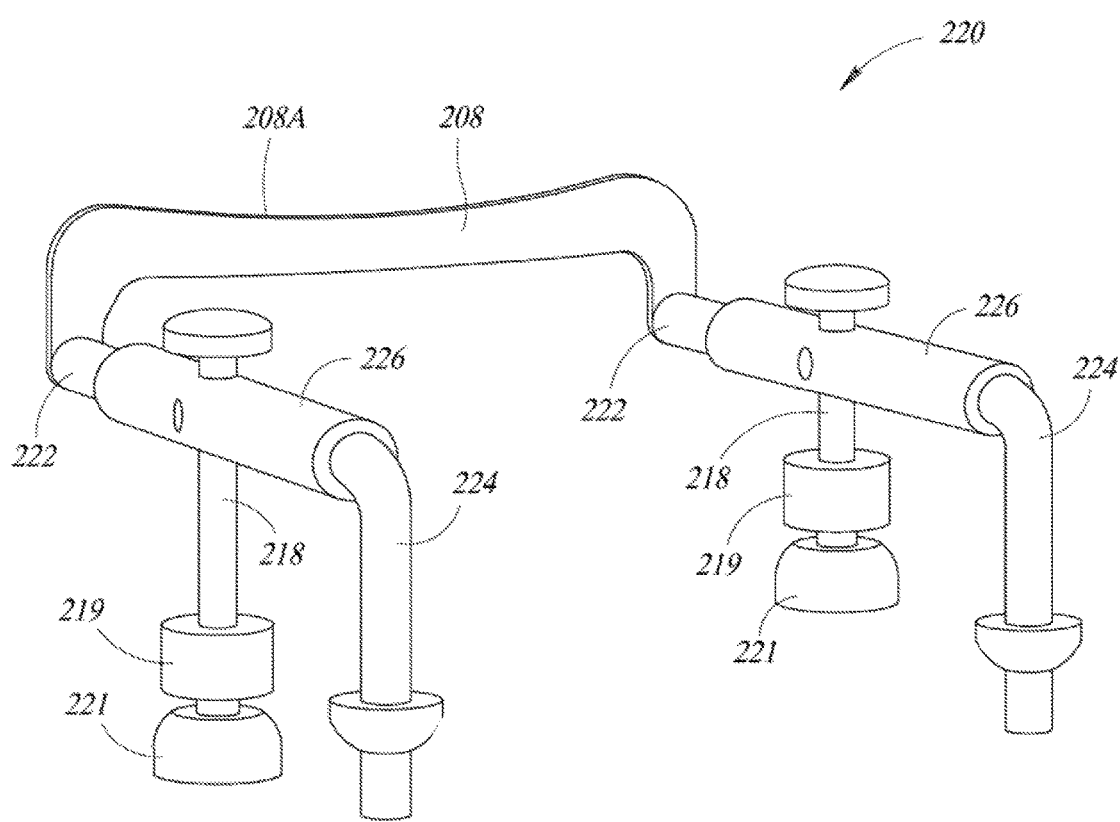
FIG. 10 is a perspective view of a bracket for attachment to an instrument body, according to one embodiment described herein.

FIG. 10 shows an alternative embodiment of a bracket 220 having rigid L-shaped supports that include a threaded horizontal portion 222 and a vertical portion 224. The threaded horizontal portions 222 can be lengthened by adjusting barrel screws 226. Additional supports 218 resting on support feet 221 may be height-adjustable by rotating adjustors 219. Alternatively, the rigid L-shaped supports may flex in response to bow pressure applied to the bowing surface 208A, thus causing the threaded horizontal portions 222 to slide vertically relative to the supports 218.

Figure 11A:
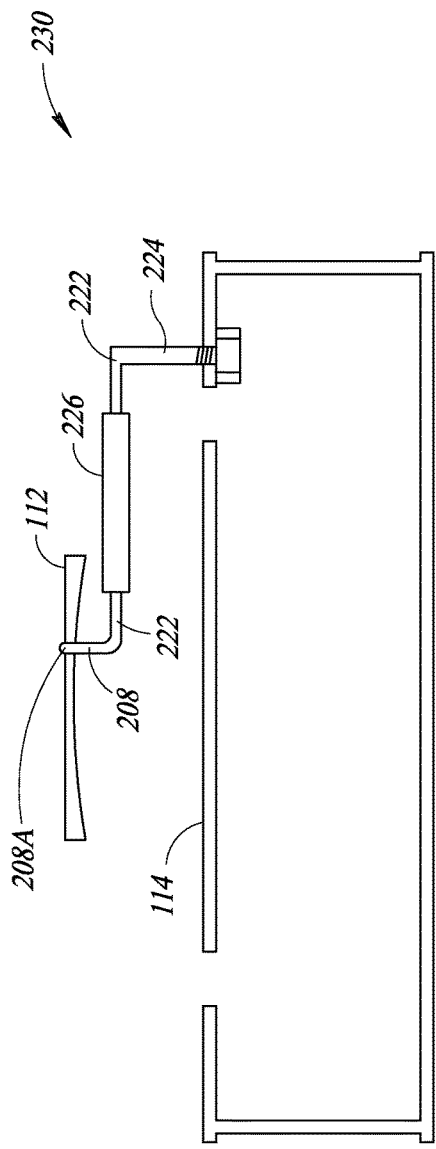
FIGS. 11A and 11B show end views of bowed instruments to which bracket-style bowing platforms are mounted, according to exemplary embodiments described herein.
Figure 11B:
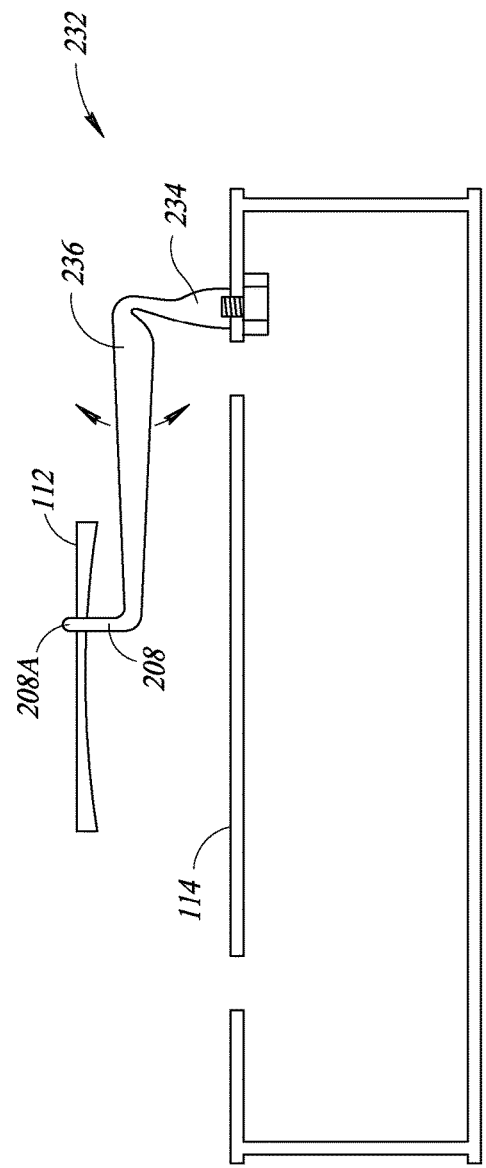

FIGS. 11A and 11B show two exemplary bracket profiles, of an L-shaped bracket 230 and a cantilevered bracket 232, respectively, relative to the proximal end of the fingerboard 112, as seen from the point of view of the player. The brackets 230 and 232 are each shown mounted to an instrument body 114 to form alternative embodiments to the bracket violin 210. The L-shaped bracket 230 is similar to the bracket 220, except that the L-shaped bracket 230 lacks the additional supports 218. The cantilevered bracket 232 includes a single support pillar 234 and a cantilevered horizontal member 236 that flexes azimuthally in response to bow pressure on the bowing surface 208A.

Figure 12A:
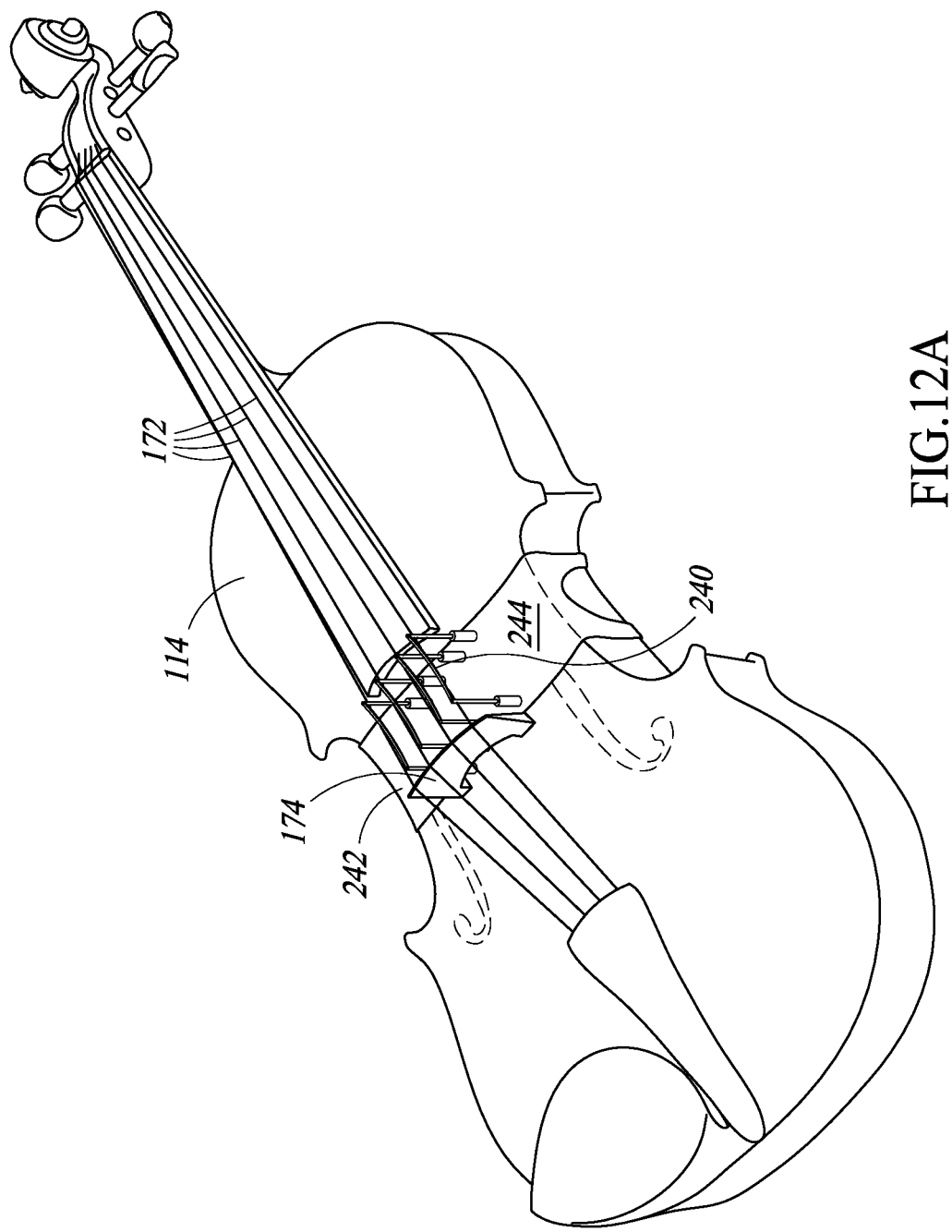
FIG. 12A shows a perspective view of a stringed instrument to which a bracket is removably attached in a non-destructive fashion, according to one embodiment described herein.

FIG. 12A shows one embodiment of a bracket 240 that resembles the bracket 210, but instead of mounting to the body 114, the bracket 240 is removably attached to the body 114 by a strap 242. The bracket 240 is thus compatible with a conventional stringed instrument and can simply be used as a learning device for improving bow technique. The strap 242 desirably fits tightly around the body 114. The bracket 240 is height-adjusted so as to extend vertically above the strings 172. The strap 242 may have a rigid or semi-rigid top portion 244 to provide stability for the bracket 240. The strap 242 may clip onto the ribs or the edges of the body 114, or the strap 242 may wrap around the body 114.

Figure 12B:
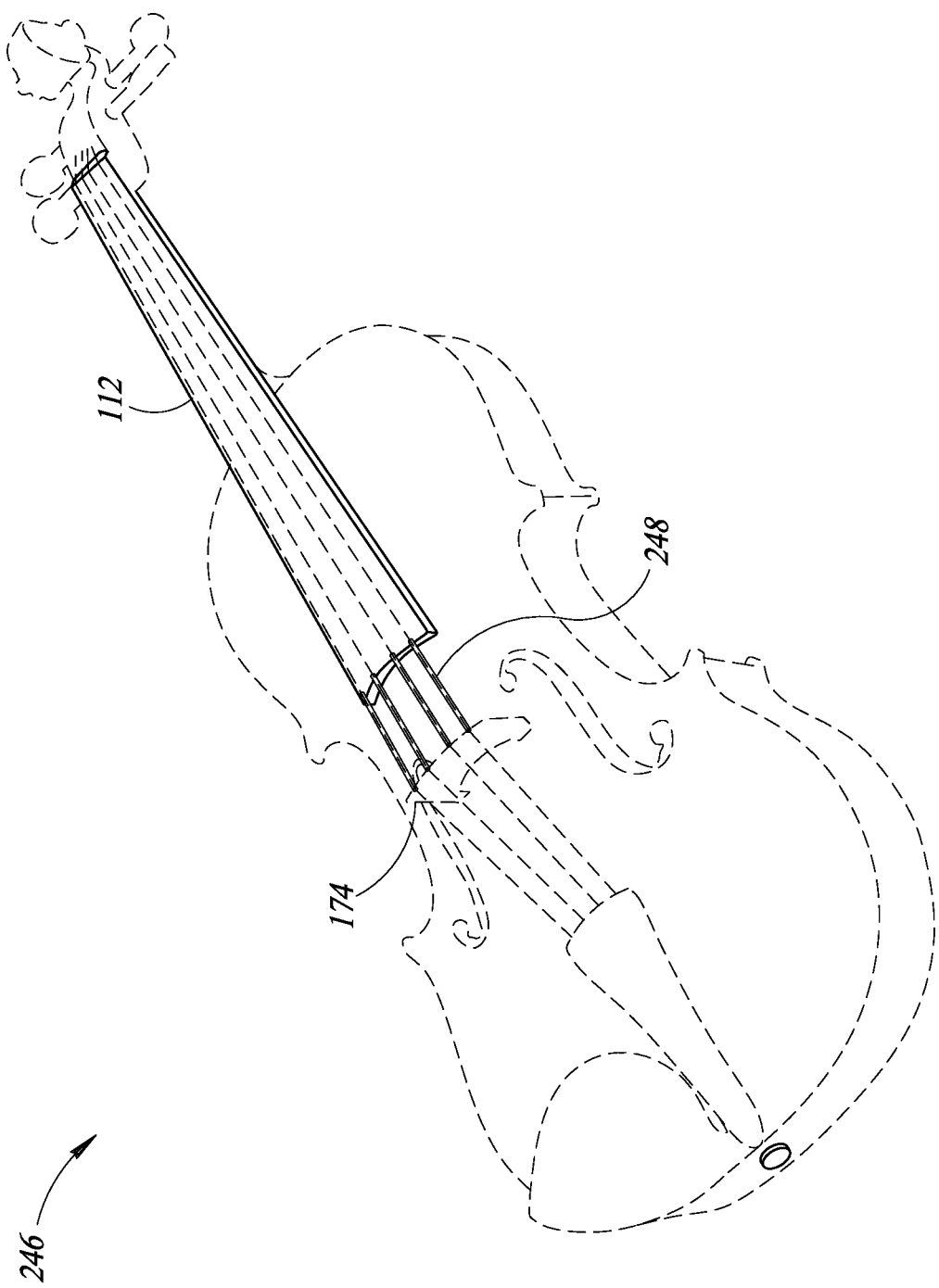
FIG. 12B shows a perspective view of a stringed instrument to which a bowing platform in the form of string covers is attached, according to one embodiment described herein.

FIG. 12B shows one embodiment of a bowing platform, 246 in which strings on a conventional violin are covered by elongated bars 248, spaced apart from the bridge 174, to provide a silent bowing surface. The elongated bars 248 in such an embodiment can take the form of one or more cylinders that clamp onto the strings in a fixed position within the region between the fingerboard 112 and the bridge 174. Alternatively, one or more cylinders can extend along most of the length of the string to completely silence the string.

Figure 13A:
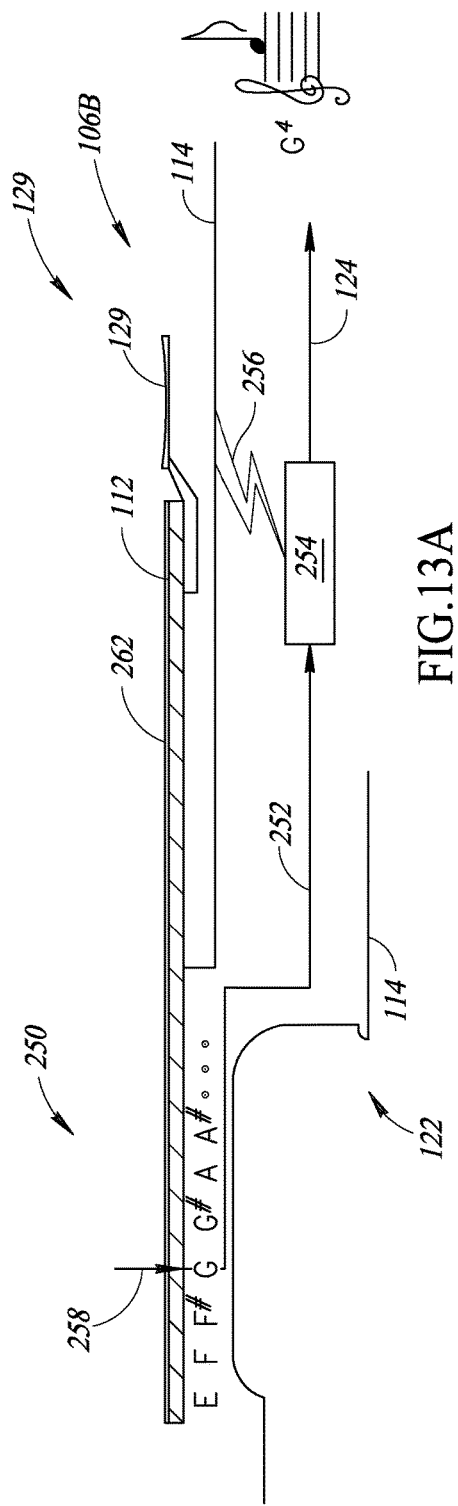
FIGS. 13A and 13B show a side elevation view in schematic form, and a top plan view, respectively, of a stringless electric violin equipped with a bowing platform having bow sensors, a pressure-sensitive fingerboard having pitch sensors, and an internal processor, according to embodiments described herein.
Figure 13B:
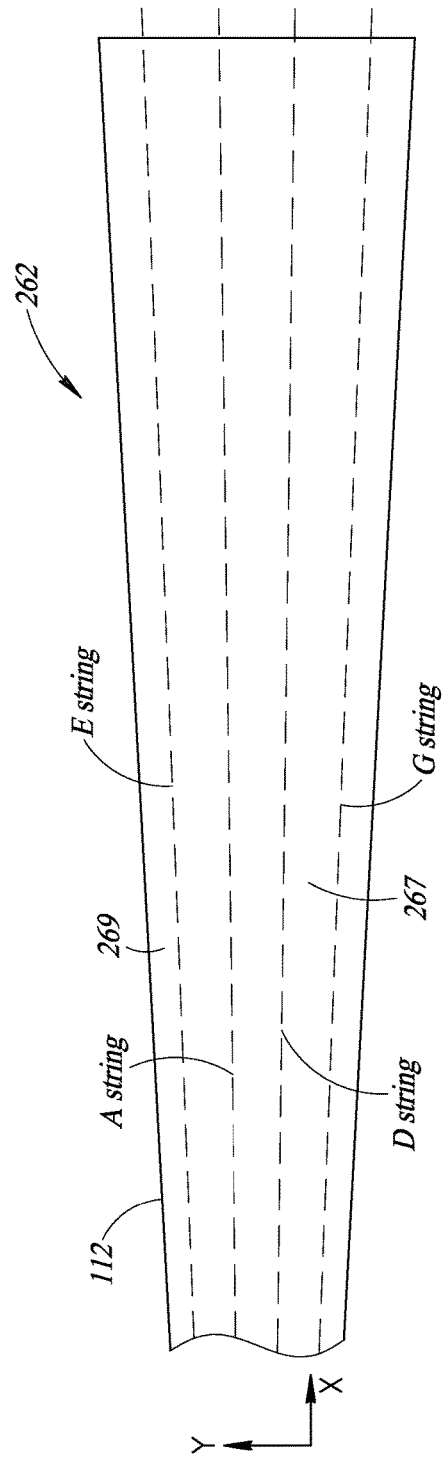

FIGS. 13A and 13B show two views of the stringless bowed musical instrument 100 having a fingerboard 112 equipped with pitch sensors 250, according to one embodiment. The pitch sensors 250 sense pressure of the player's fingers at all locations on the surface of the fingerboard 112. FIG. 13A illustrates a first signal path 252 from the pitch sensors 250 to a microprocessor 254, and a second signal path 256 from a bow sensor, e.g., the piezoelectric transducer 106B, to the microprocessor 254. The signal paths 254 and 256 direct electrical signals carrying pitch information and bow motion information, respectively, to the microprocessor 254 for processing according to programmed instructions residing in a computer memory. The computer memory may be located, for example, on board the microprocessor or co-located with the microprocessor, e.g., inside the body 114, or outside the body 114 in an external computing device. The microprocessor 254 then combines pitch data with bow motion data to form one or more output signals 124 representing a composite sound. The microprocessor 254 transmits the output signal 124 to a sound-producing apparatus such as an amplifier and speakers or headphones. Sound production proceeds according to well-known methods used for electric or amplified instruments, in which electric signals are supplied by an electronic "pickup" or transducer that would typically be mounted, for example, on the bridge 174. Thus, for example, if a player's finger exerts pressure on the fingerboard 112 at a location 258 corresponding to a "G" pitch, the microprocessor 254 converts a sensed signal transmitted along the first signal path 252 into a signal that the sound-producing apparatus can interpret and generate as the sound "G".

To capture all of the possible pitches represented by different locations on the fingerboard 112, as shown in FIG. 13B, the fingerboard 112 is covered with a touch-sensitive skin 262. The touch-sensitive skin 262 is sensitive to finger pressure at all X-Y locations across its entire surface, not just where the strings would normally be located as indicated by the dashed lines. When a very light finger pressure is sensed, the microprocessor 254 can be programmed to ignore the pressure sensor signal, and when a strong pressure is sensed, the microprocessor 254 can be programmed to generate a clear tone corresponding to the note at the touched location. Alternatively, when the sensed pressure is below a certain threshold value, the microprocessor 254 can be programmed to reproduce a fuzzy sound that would actually occur when light pressure is applied to a string. When finger pressure is sensed at location 267, equidistant between the G string and the D string, the microprocessor 254 can be programmed to ignore the signal, in order to train the player not to place their finger where there is no string on a corresponding conventional instrument. Alternatively, the microprocessor 254 can be programmed to assign the pitch at point 267 to either one of a location on the G string or a corresponding location on the D string. Alternatively, the microprocessor 254 can be programmed to generate both pitches simultaneously as a two-note double stop in perfect fifths, as if the player's finger were covering both strings. Alternatively, the microprocessor 254 can be programmed to interpolate between the two pitches, which would produce an exotic sound that is different from the response of a conventional instrument. When finger pressure is sensed at a Y-location 269, between the E string and the edge of the fingerboard, a pitch that is a fifth higher than the corresponding location on the E string can be generated, thereby increasing the effective upper range of the instrument beyond the usual violin range. Likewise, when pressure is sensed at Y-locations below the G string, tones below the G string can be generated, extending the lower range of the instrument. Consequently, a stringless violin as described herein is capable of producing new sounds that are not possible on a conventional stringed instrument. The stringless violin can then serves as a creative experimental and improvisational tool for a sophisticated performance artist.

Figure 14A:
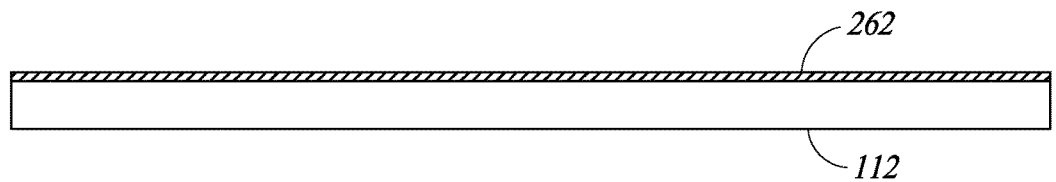
FIGS. 14A and 14B show a side elevation view and an end view, respectively, of a fingerboard to which a pressure-sensitive skin of uniform thickness is attached, according to one embodiment described herein.
Figure 14B:
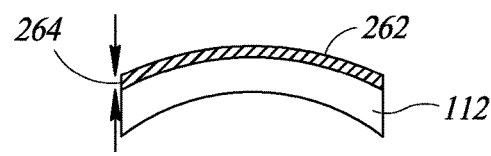
Figure 14C:
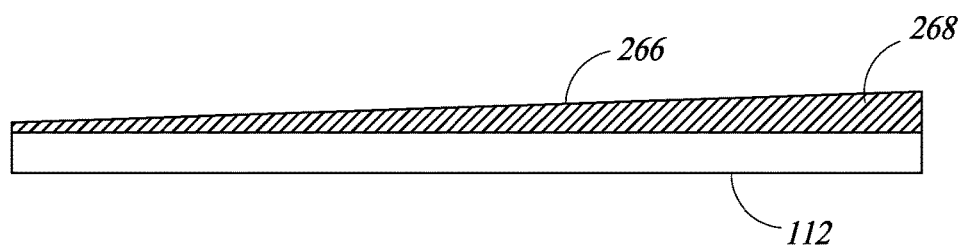
FIGS. 14C and 14D show a side elevation view and an end view, respectively, of a fingerboard to which a pressure-sensitive skin of non-uniform thickness is attached, according to one embodiment described herein.
Figure 14D:
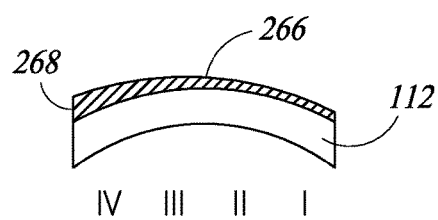

FIGS. 14A-14D show different embodiments of the touch-sensitive skin 262, which is held in contact with the top surface of the fingerboard 112, for example, by an adhesive. FIGS. 14A, 14B show a side view and an end view, respectively, of the touch-sensitive skin 262 having a uniform thickness 264. FIGS. 14C, 14D show a side view and an end view, respectively, of the touch-sensitive skin 262 having a non-uniform thickness 266. In one embodiment, shown in FIG. 14C, the touch-sensitive skin 262 is thicker on a high-pitch end 268 of the fingerboard 112 that typically corresponds with advanced finger positions. In one embodiment shown in FIG. 14D, the touch-sensitive skin 262 is thicker on a side 268 of the fingerboard 112 that typically corresponds with lower pitched sounds.

FIGS. 15A and 15B show an optical pitch sensor 270 according to one embodiment that uses one or more light beams 272 to detect finger placement on the fingerboard 112. Although the cantilevered bracket 232 is shown as the bowing platform in this example, any one of the bowing platform embodiments shown or described herein may be adapted for use with the optical pitch sensor 270. The cantilevered bracket 232 is equipped with a light source 274 that emits the light beams 272, and a light detector 276. Each light beam 272 propagates slightly above the fingerboard 112 toward the scroll 203 until the light beam 272 encounters a player's finger in contact with the top surface of the fingerboard 112. The finger will then scatter the light beam (s) 272, causing some portion of backscattered light to propagate toward the bracket 232 for detection by the light detector 276. A signal path 278 within the cantilevered bracket 232 transmits an electrical signal that varies with the time elapsed between emission and detection of the backscattered light intensity. A corresponding measured distance D between the light detector and the player's finger can be calculated by the microprocessor 254. The microprocessor 254 can then translate the measured distance D to a corresponding musical pitch. The light detector 276 can be calibrated by performing a measurement of light scattered from the nut at the end of the fingerboard 112, and from a known distance C separating the fingerboard 112 from the cantilevered bracket 232.

A bowed instrument equipped with a bowing platform 102 according to in any one of the embodiments described herein, along with bow sensors, and optionally, with pitch sensors, can be used as an interactive controller for video games, interactive computerized teaching tools, and virtual reality musical experiences. In an electronic teaching scenario, electronic monitoring of the player's technique as they are playing along with a selected music recording can be used to provide interactive feedback to advance the player's skills. Such interactive feedback is advantageous compared to conventional methods musicians use to improve their own playing, such as laboriously practicing against a metronome, or recording and self-evaluating their own playing. In an electronic coaching scenario, multiple players can be monitored and evaluated while playing a selected piece together as an ensemble in real time. In an electronic competition scenario, players can compete against one another or against an independent standard, such as a known virtuoso, in a virtual competition that is evaluated by an electronic processor programmed to provide feedback based on the sensor data, and to judge the competition objectively. Graphics projected onto a screen can be used to enhance such a virtual reality musical experience.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A bowed musical instrument, comprising:
a body;
a fingerboard extending over, and spaced apart from, a top surface of the body;
pitch sensors that detect placement locations of a player's fingers placed on the fingerboard;
a support member attached to at least one of the body or the fingerboard;
a track connected to the support member, the track having a bowing surface to receive a bow for the musical instrument, the track equipped with a bow sensor that detects motion of the bowing surface; and
electronic components configured to
receive information from the pitch sensors and the bow sensor;
process the information; and
transmit a signal to a sound-generating device.

2. The bowed musical instrument of claim 1 wherein the fingerboard has no frets.

3. The bowed musical instrument of claim 1 wherein the support member is mounted to the fingerboard.

4. The bowed musical instrument of claim 3 wherein the support member extends underneath the fingerboard.

5. The bowed musical instrument of claim 1 wherein the support member is mounted to the body.

6. The bowed musical instrument of claim 1 wherein the support member is removably attached to the instrument.

7. The bowed musical instrument of claim 1, wherein the bowing surface has a concave profile.

8. The bowed musical instrument of claim 1, comprising a plurality of support members and a plurality of tracks, each track attached to a separate support member, the plurality of tracks arranged adjacent to, and spaced apart from, one another, and the plurality of tracks being non-co-planar, so as to permit independent bowing of each track.

9. A bowed musical instrument, comprising:
a body;
a fingerboard extending over a top surface of the body;
optical pitch sensors that detect placement locations of a player's fingers placed on the fingerboard;
a support member attached to at least one of the body or the fingerboard;
a track connected to the support member, the track having a bowing surface to receive a bow for the musical instrument, the track equipped with:
a bow sensor that detects motion of the bowing surface, the support member positioned so as to elevate the bowing surface to a height above a height of the fingerboard;
a light source that generates a light beam aligned with the fingerboard; and
a light sensor, the light source and the light sensor cooperating to detect finger placement locations on the fingerboard, each location being associated with a musical pitch; and
electronic components configured to
receive information from the pitch sensors and the bow sensor;
process the information; and
transmit a signal to a sound-generating device.

10. A musical instrument, comprising:
a body;
a fingerboard extending over, and spaced apart from, a top surface of the body;
a support mounted to the fingerboard; and
a track comprising:
a vertical member coupled to the support, and
an elongated bar connected to the vertical member, the elongated bar extending beyond an end of the fingerboard and having a bowing surface for receiving a bow for the musical instrument, wherein the vertical member elevates the bowing surface to a position above a top surface of the fingerboard.

11. The musical instrument of claim 10, further comprising mounting hardware coupling the support to the fingerboard of the bowed musical instrument, the mounting hardware including a tightening mechanism for insertion into an opening in the fingerboard.

12. The musical instrument of claim 10, further comprising:
a plurality of pitch sensors that detect placement locations of a player's fingers placed on the fingerboard;
a bow sensor that detects motion of the bowing surface, the bow sensor being responsive to a force applied against the bowing surface; and
electronic components configured to
receive information from the pitch sensors and the bow sensor;
process the information; and
transmit a signal to a sound-generating device.

13. The musical instrument of claim 12 wherein the bow sensor includes a piezoelectric transducer.

14. The musical instrument of claim 10 wherein at least the support and the vertical member are portions of a unitary structure.

15. A musical instrument, comprising:
a body;
a fingerboard extending over, and spaced apart from, a top surface of the body;
a support;
a support mount that attaches the support to the body, the support mount holding the support in a substantially fixed position; and
a track coupled to the support, the track including an elongated bar substantially aligned in a same direction as the fingerboard, the elongated bar providing a vibrational bowing surface positioned above the fingerboard to receive a bow.

16. The musical instrument of claim 15, comprising pitch indicators located at finger positions of various musical notes on the fingerboard.

17. The musical instrument of claim 15 wherein the support is a cantilevered pedestal suspended over the top of the instrument and attached to the top of the instrument at a single location.

18. The musical instrument of claim 15 wherein the support comprises a plurality of legs mounted substantially perpendicular to the top of the instrument.

19. The musical instrument of claim 15 wherein the support comprises a hinge, and a height of the track is adjustable by adjusting a hinge angle of the track with respect to the support.

20. The musical instrument of claim 15, comprising:
pitch sensors that detect placement locations of a player's fingers placed on the fingerboard;
a bow sensor that detects motion of the bowing surface; and
electronic components configured to
receive information from the pitch sensors and the bow sensor;
process the information; and
transmit a signal to a sound-generating device.

21. A musical instrument, comprising:
a body;
a fingerboard extending over a top surface of the body;
a plurality of optical pitch sensors that detect placement locations of a player's fingers placed on the fingerboard, the plurality of optical pitch sensors comprising:
a light source that emits a light beam that propagates along the fingerboard, and
a light detector that cooperates with the light source to detect a finger placement location on the fingerboard; and
electronic components configured to
receive information from the optical pitch sensors;
process the information to determine a musical pitch corresponding to the finger placement location; and
transmit a signal to a sound-generating device to generate the musical pitch.

22. The musical instrument of claim 21, further comprising
a bowing platform attached to at least one of the body or the fingerboard, the light source and the light detector being integrated with the bowing platform.

23. The musical instrument of claim 21, wherein the light source and the light detector are located proximate to the body or the fingerboard.

24. The musical instrument of claim 21, wherein the information is associated with an elapsed time between the light source emitting the light beam and the light detector detecting the finger placement location.

* * * * *